April 23, 1946.  R. L. EWALD ET AL  2,398,780
FRUIT TREATING MACHINE
Filed Oct. 31, 1940     19 Sheets-Sheet 1

INVENTORS.
Raymond L. Ewald
Henry A. Skog
BY Cox Moore & Olson ATTORNEYS.

April 23, 1946.  R. L. EWALD ET AL  2,398,780
FRUIT TREATING MACHINE
Filed Oct. 31, 1940  19 Sheets-Sheet 3

INVENTORS.
Raymond L. Ewald
Henry A. Skog
BY Cox Moore & Olsen
ATTORNEYS.

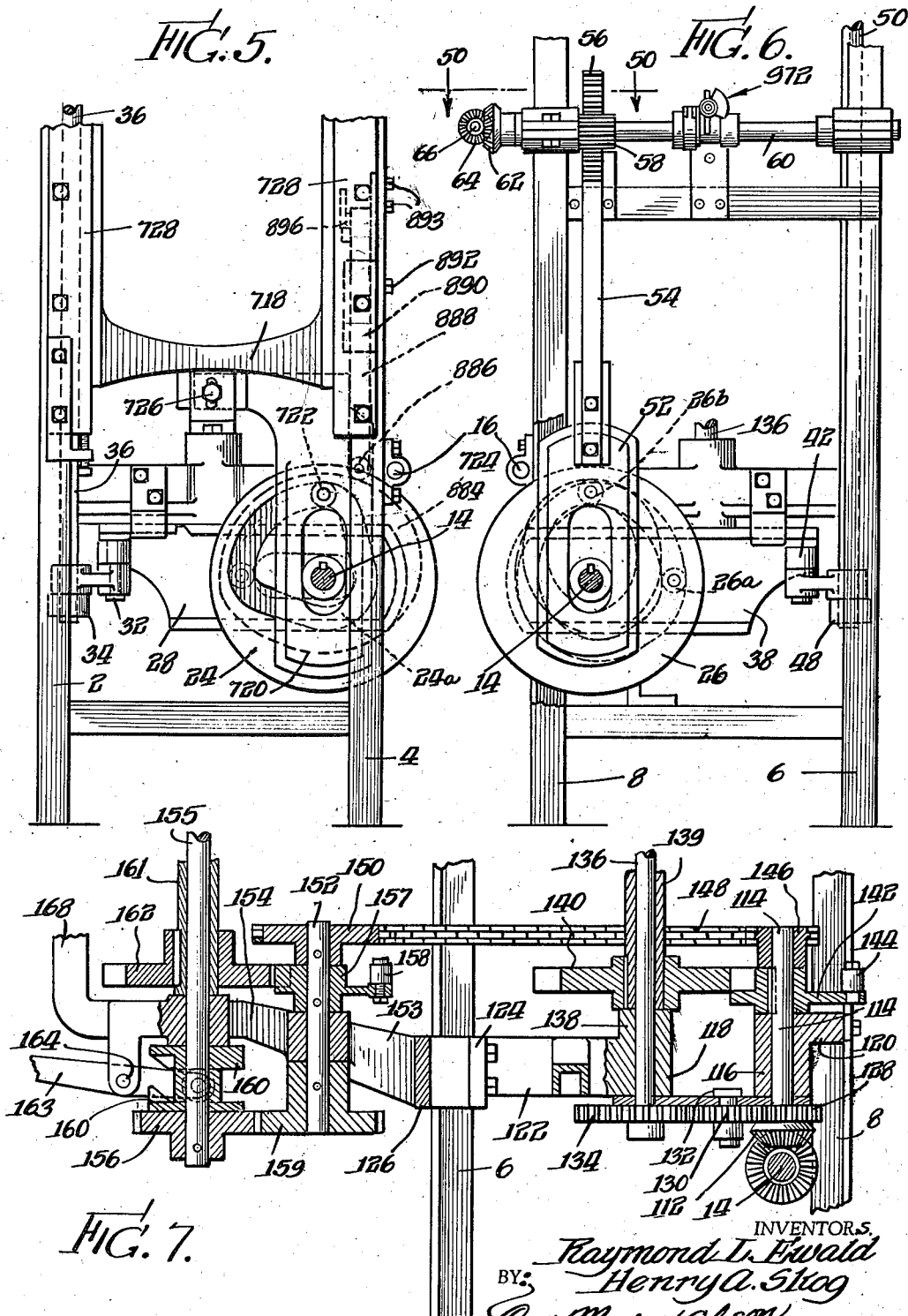

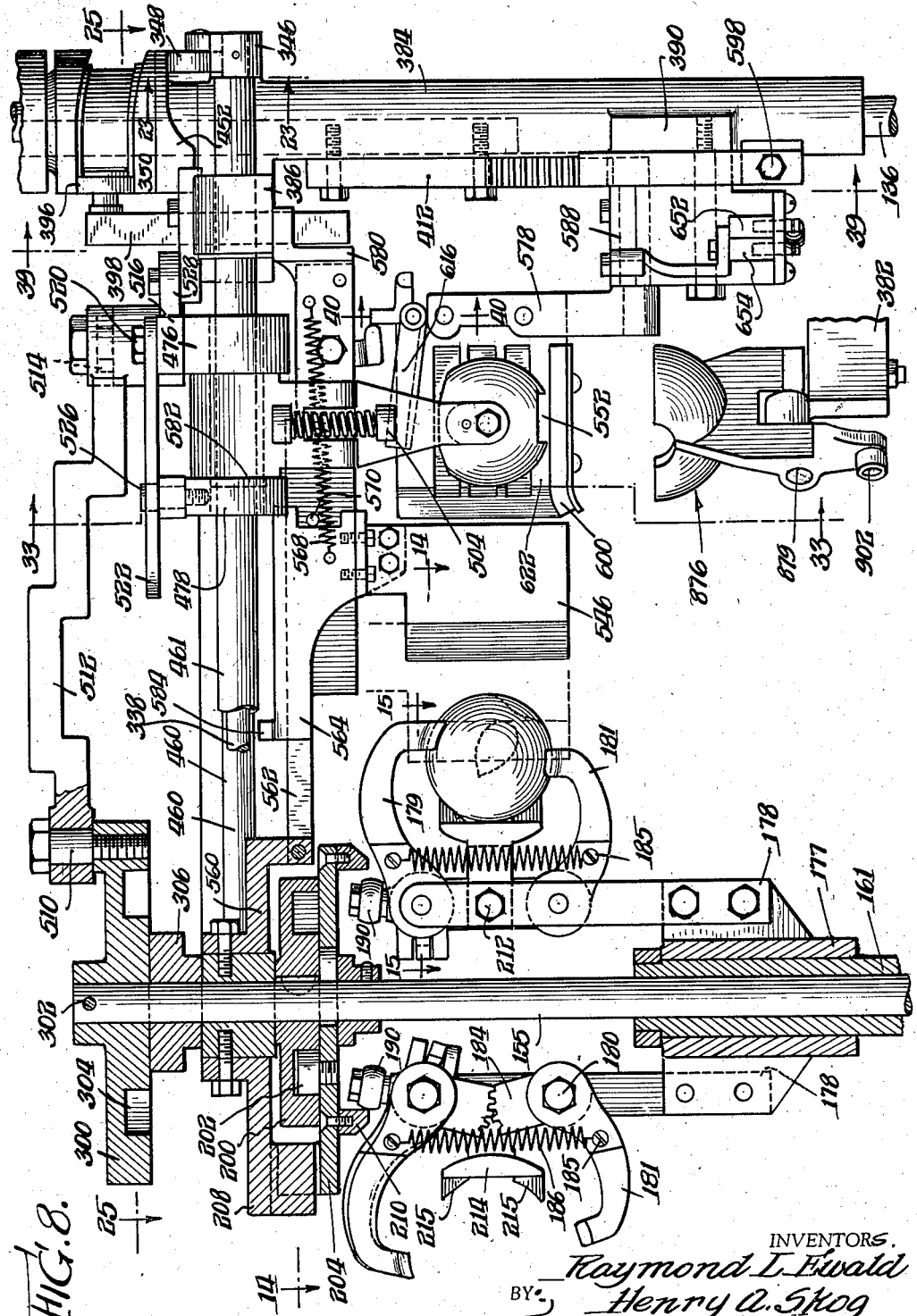

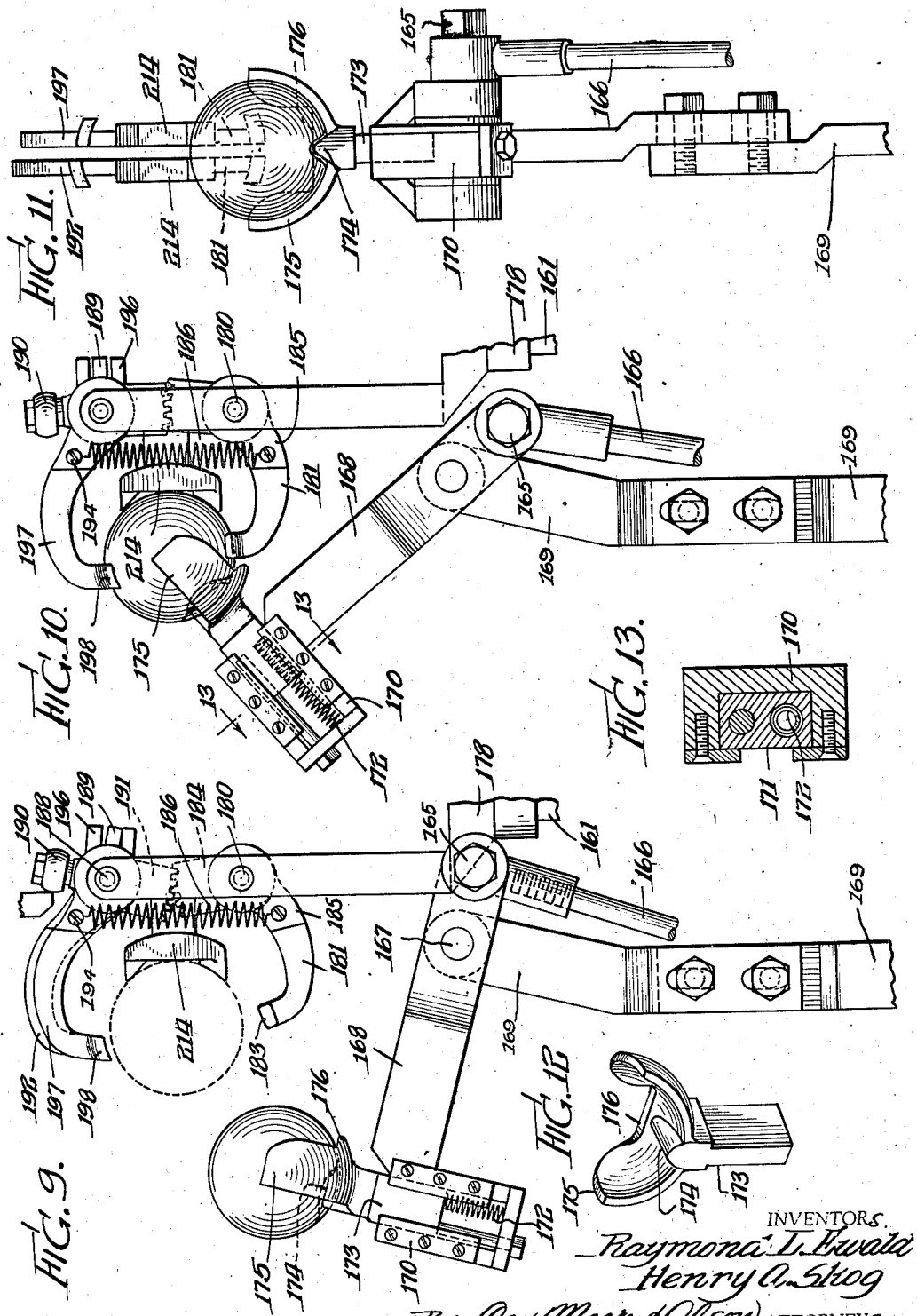

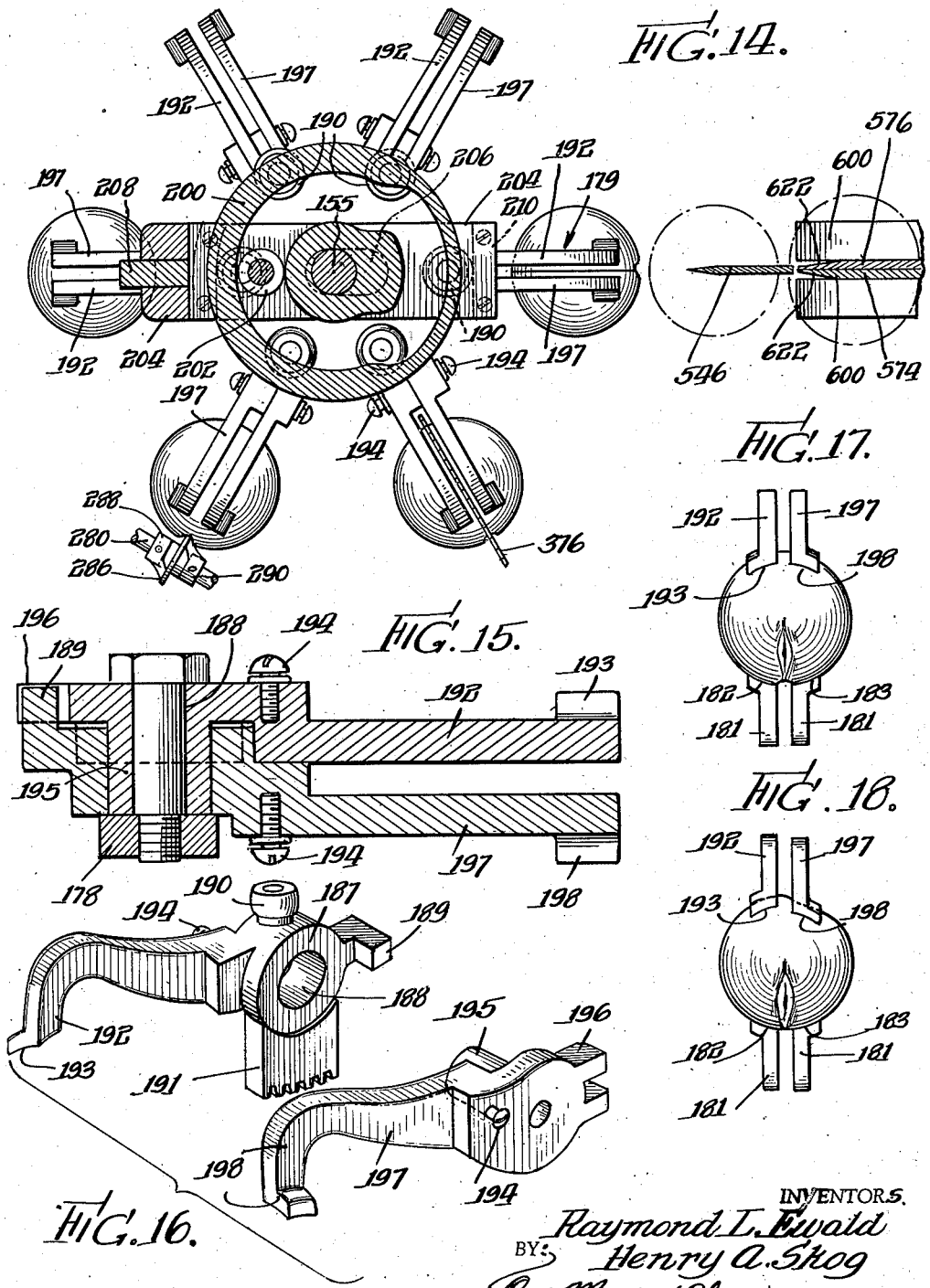

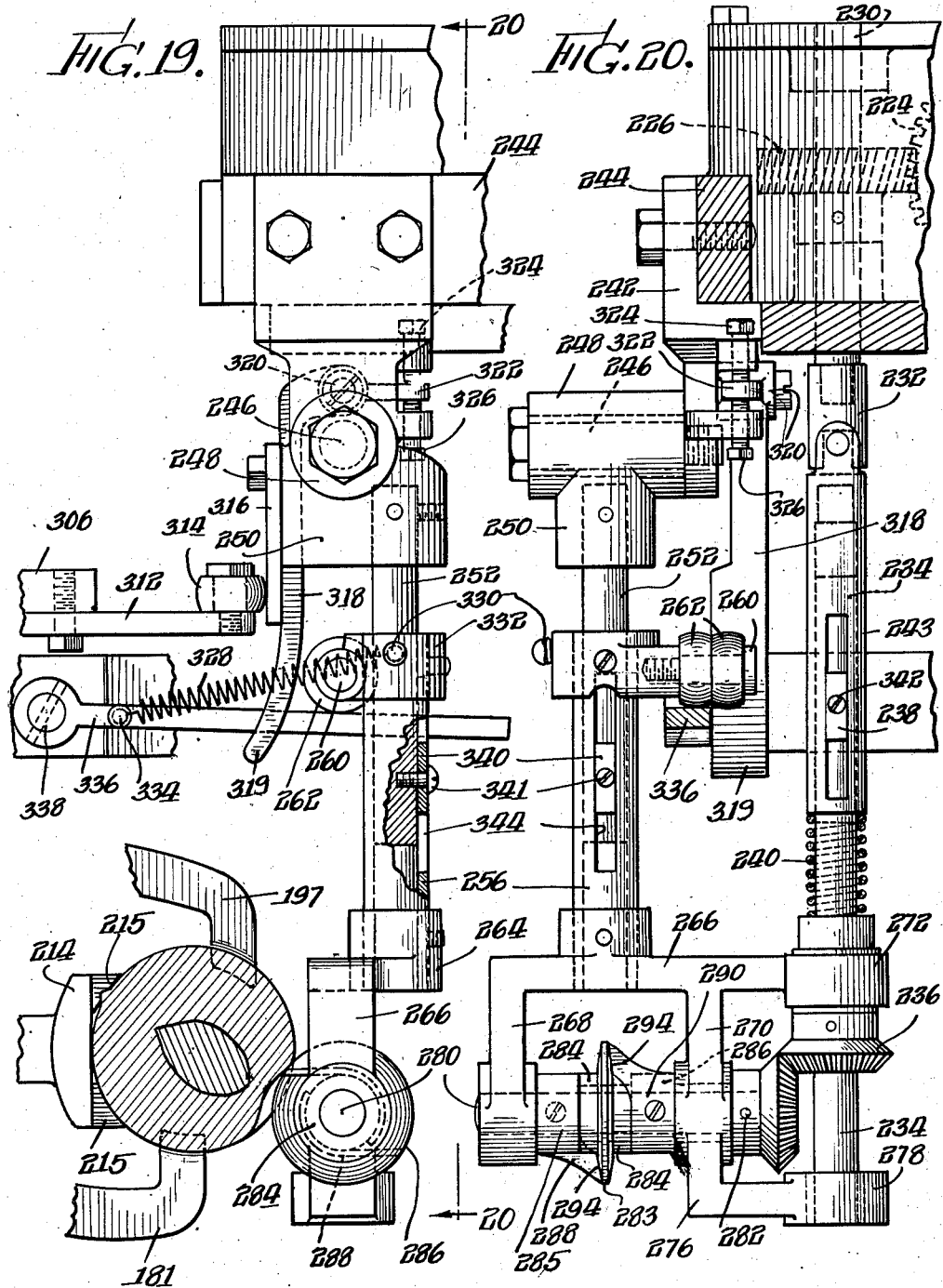

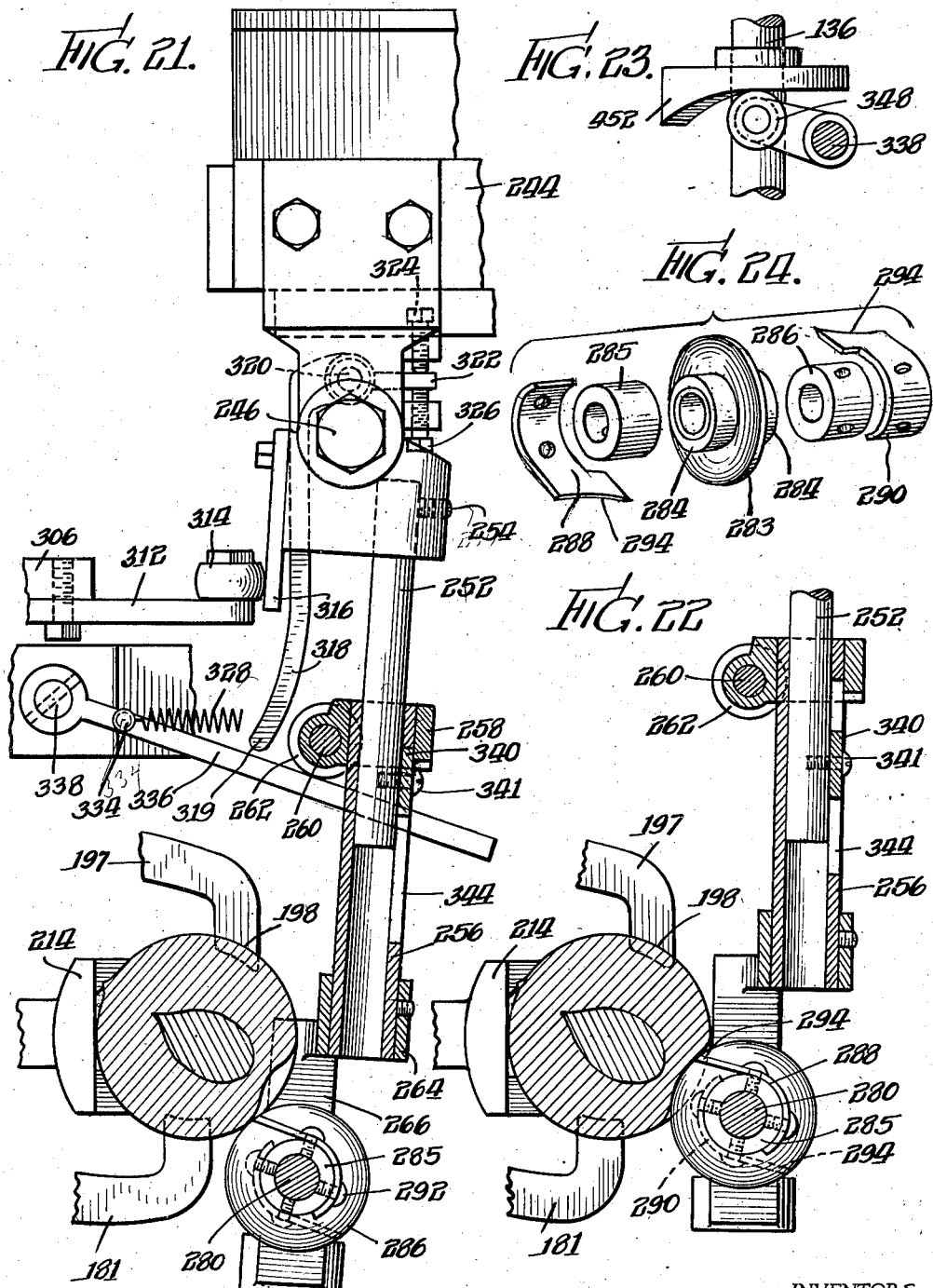

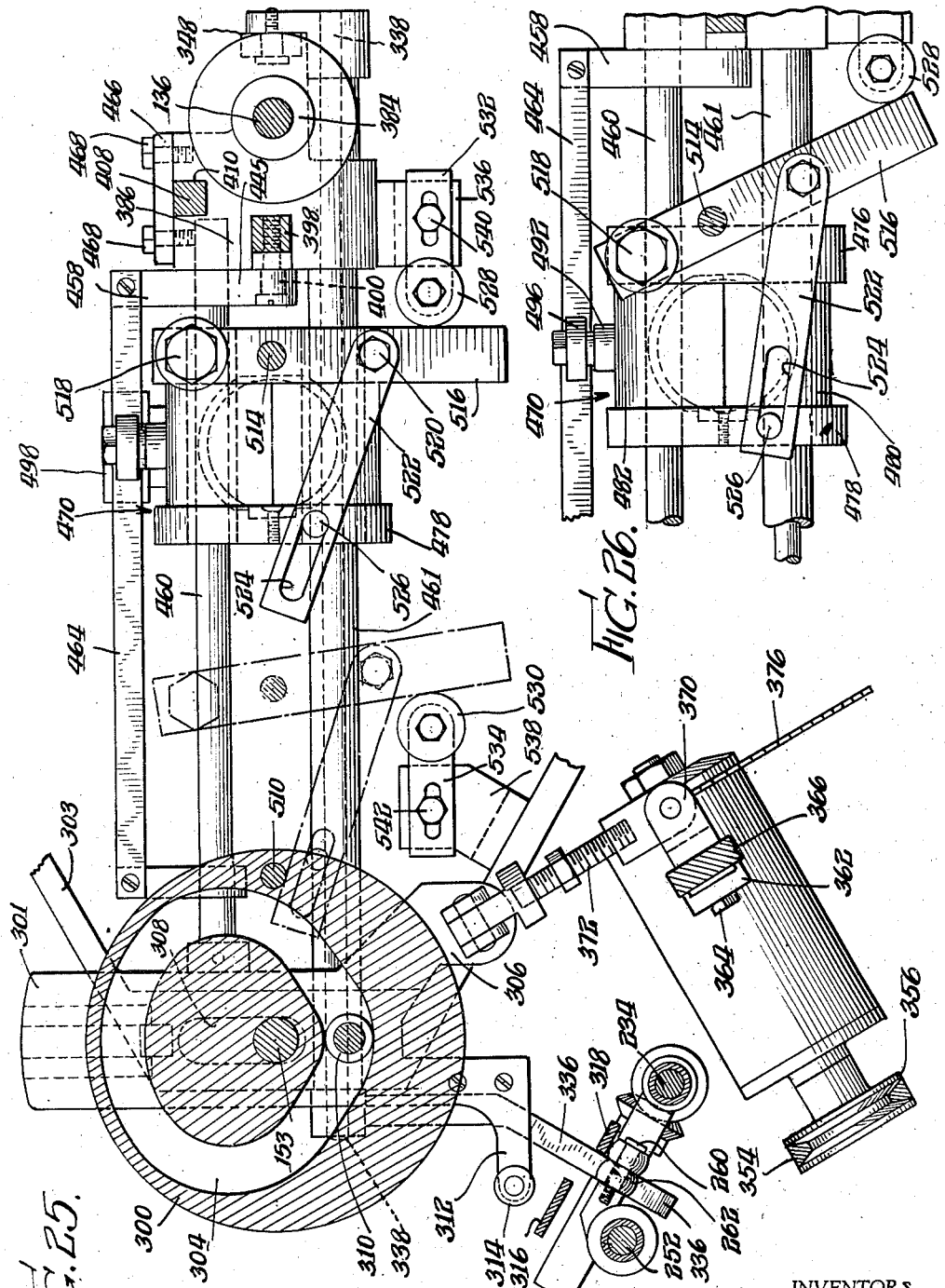

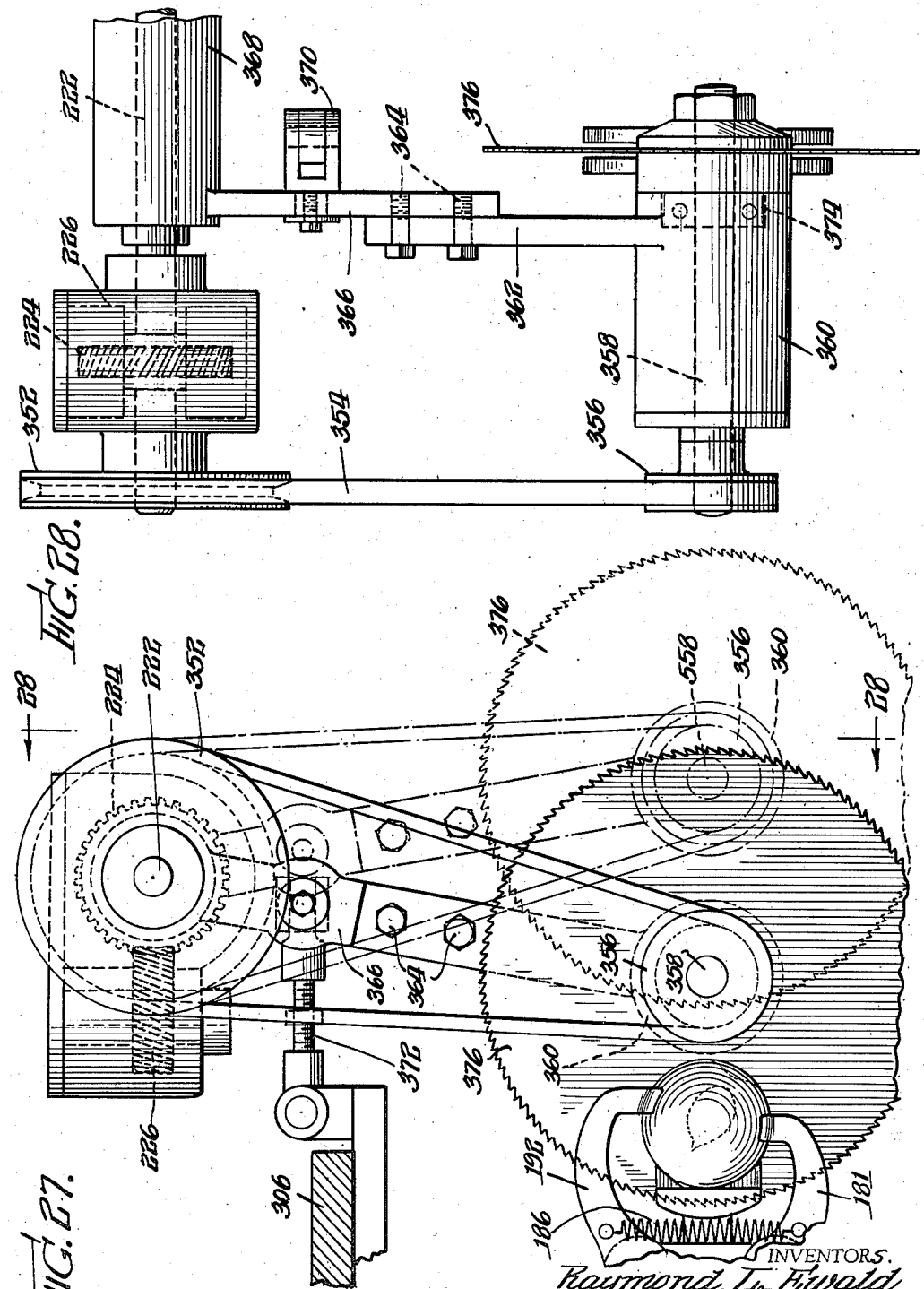

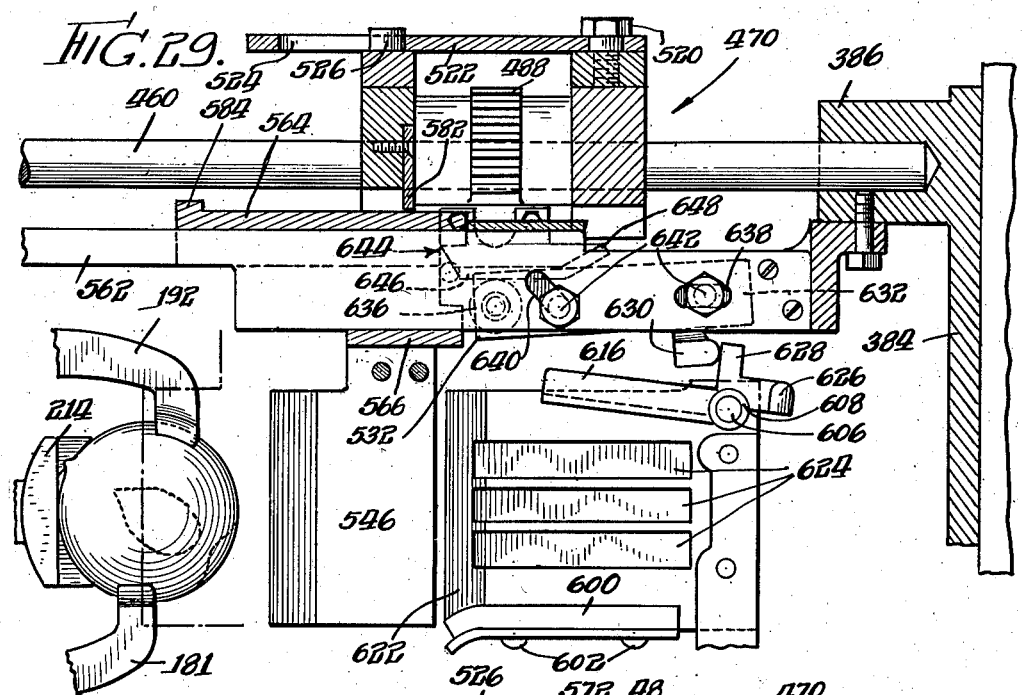
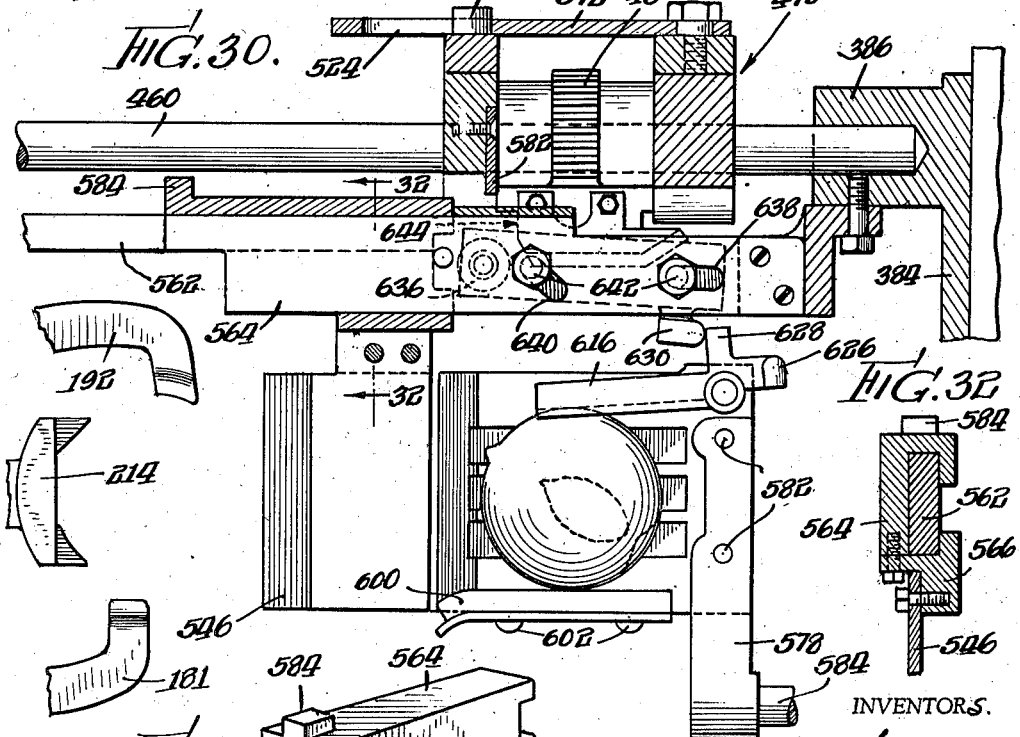

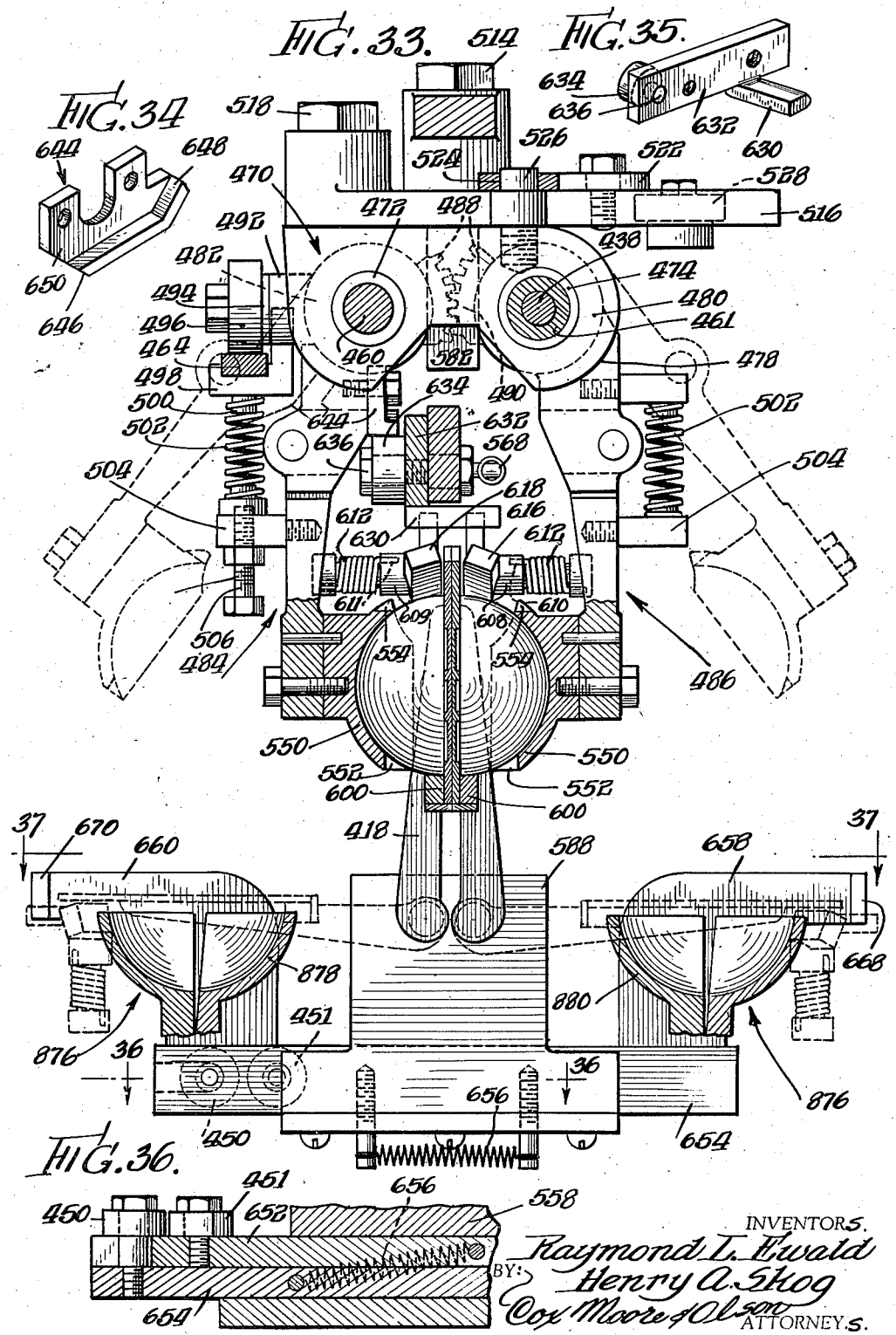

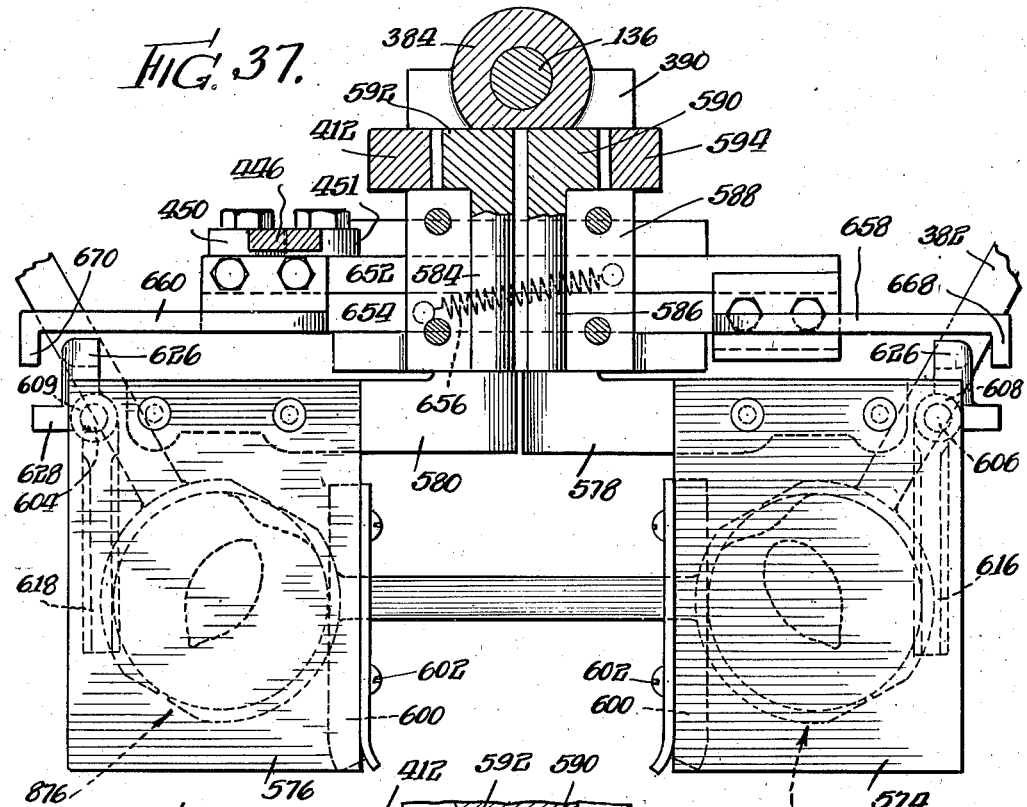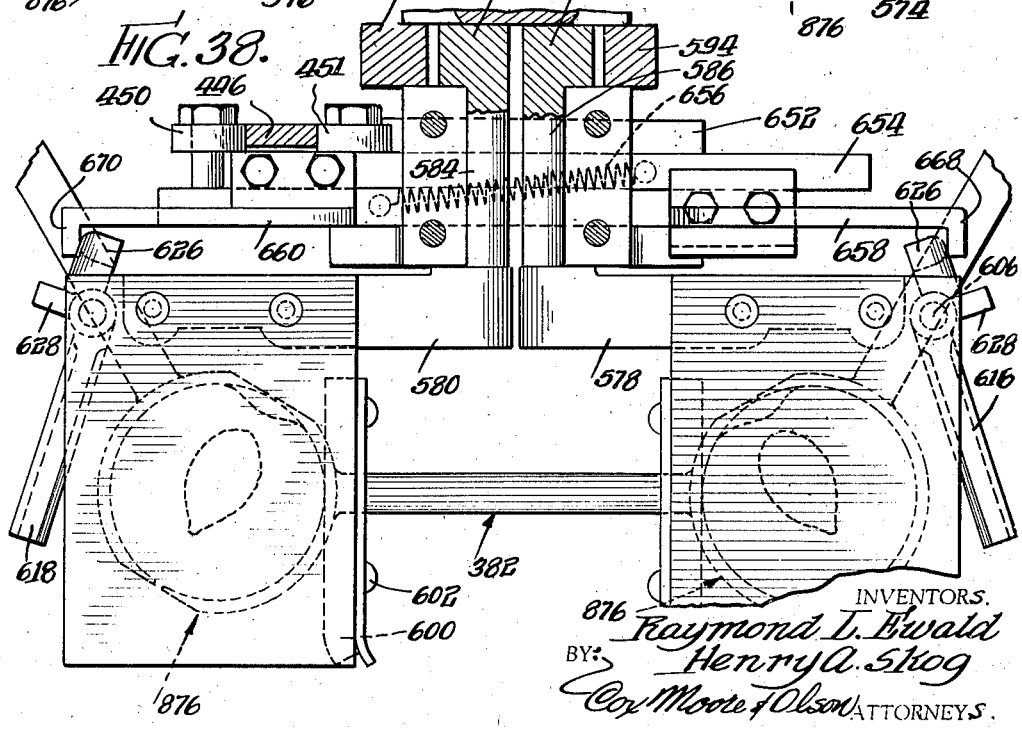

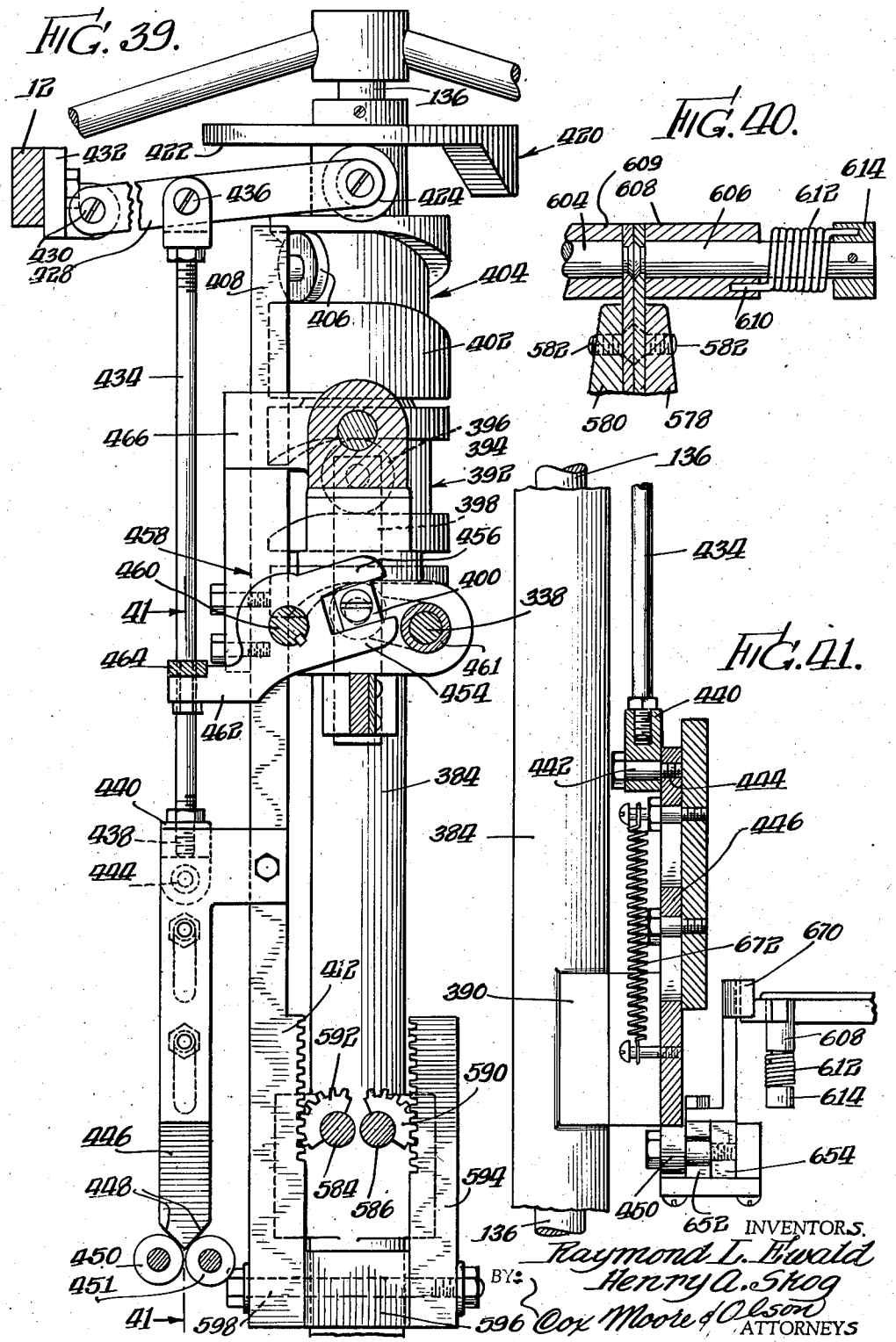

April 23, 1946.  R. L. EWALD ET AL  2,398,780
FRUIT TREATING MACHINE
Filed Oct. 31, 1940   19 Sheets-Sheet 16
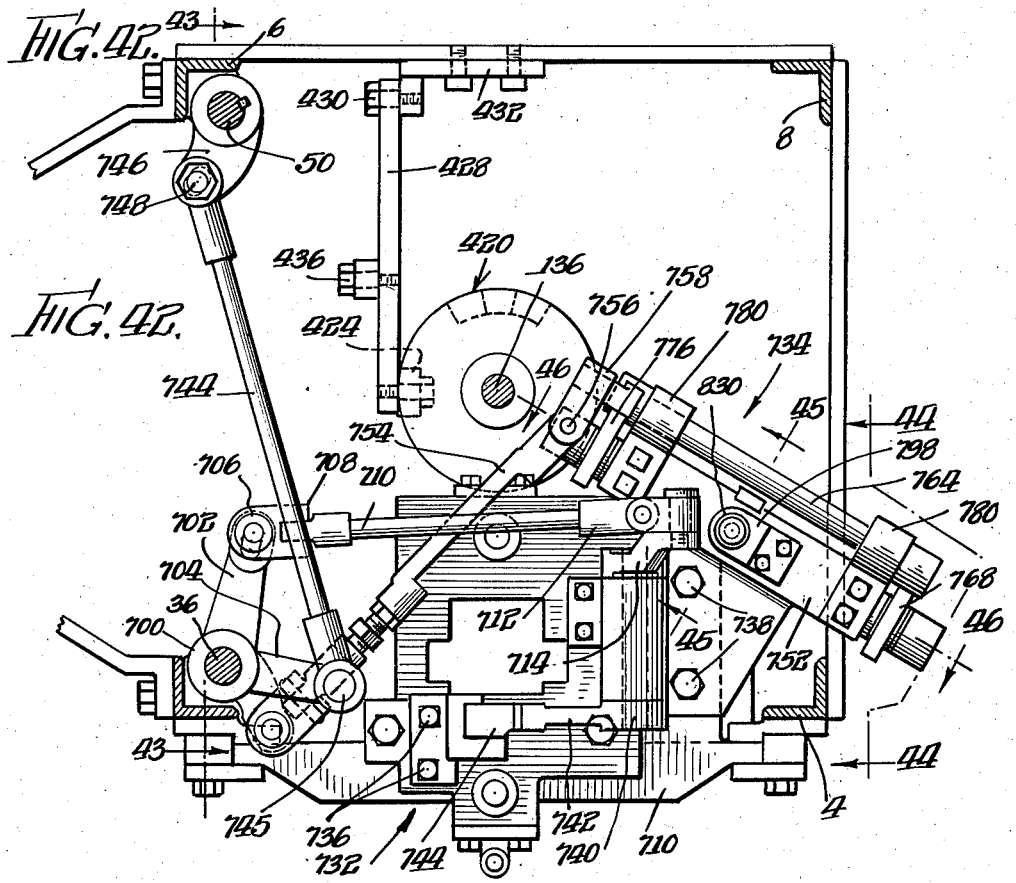
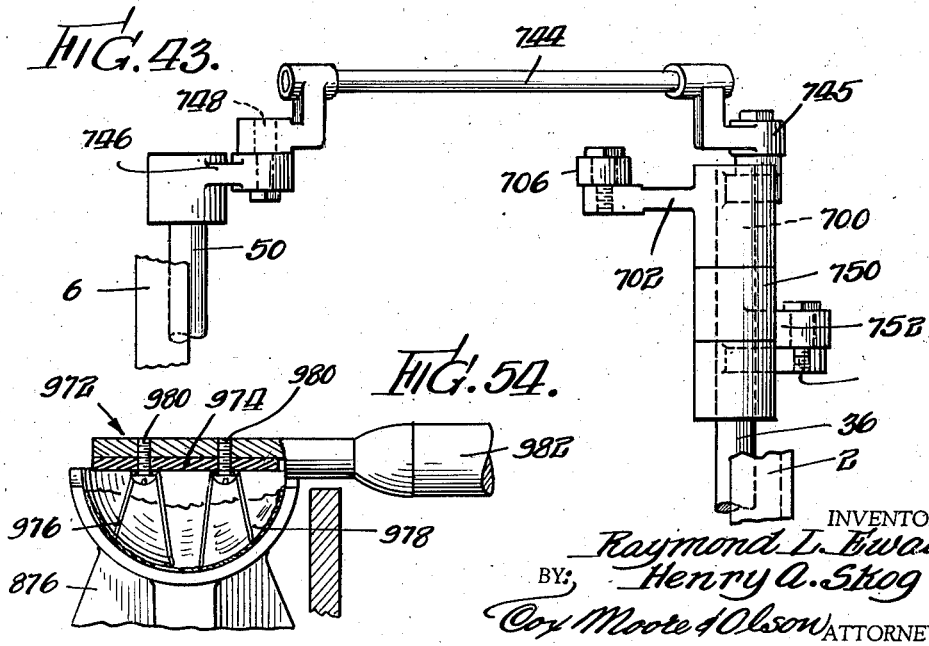
INVENTORS
Raymond L. Ewald
Henry A. Skog
BY Cox, Moore & Olson
ATTORNEYS

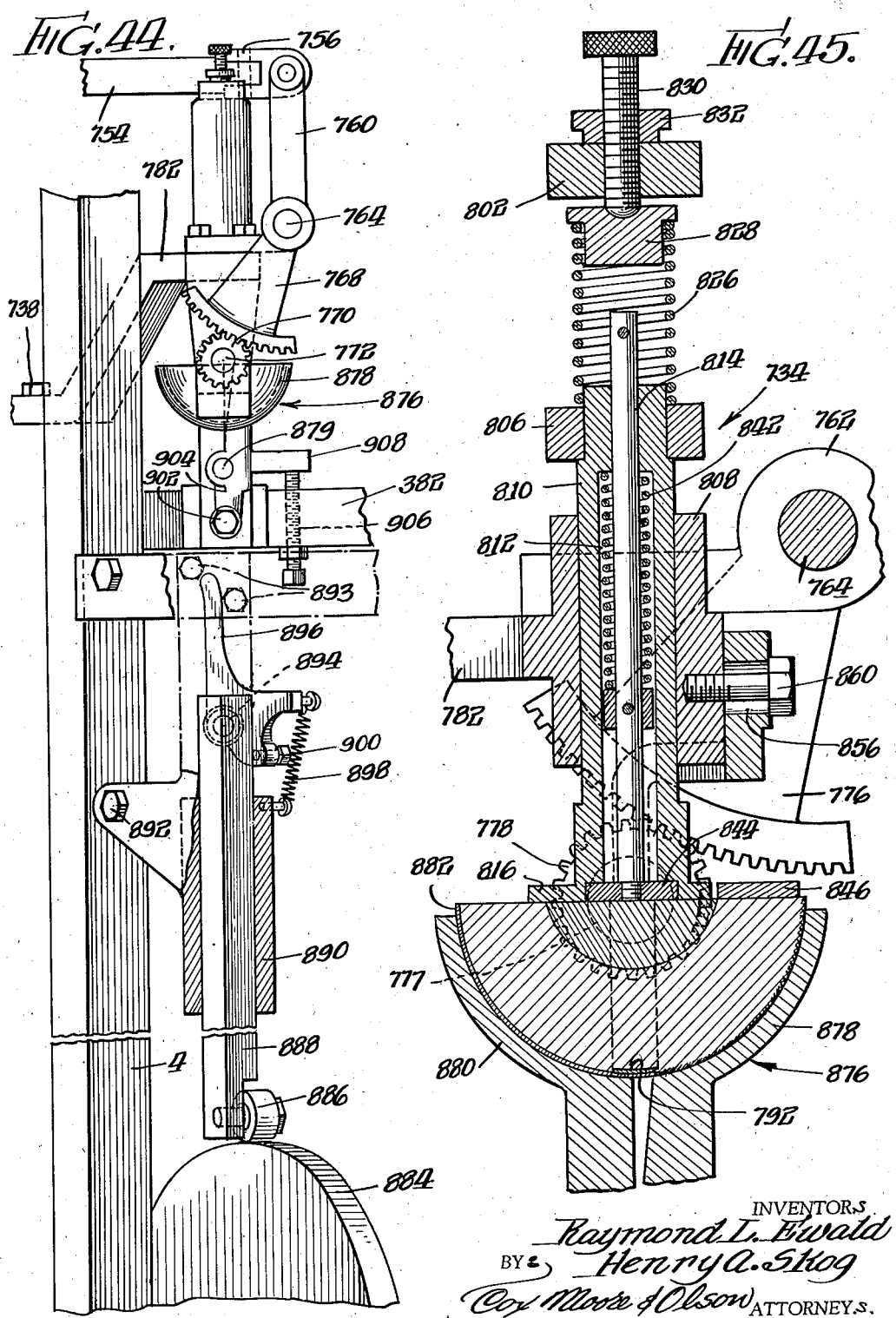

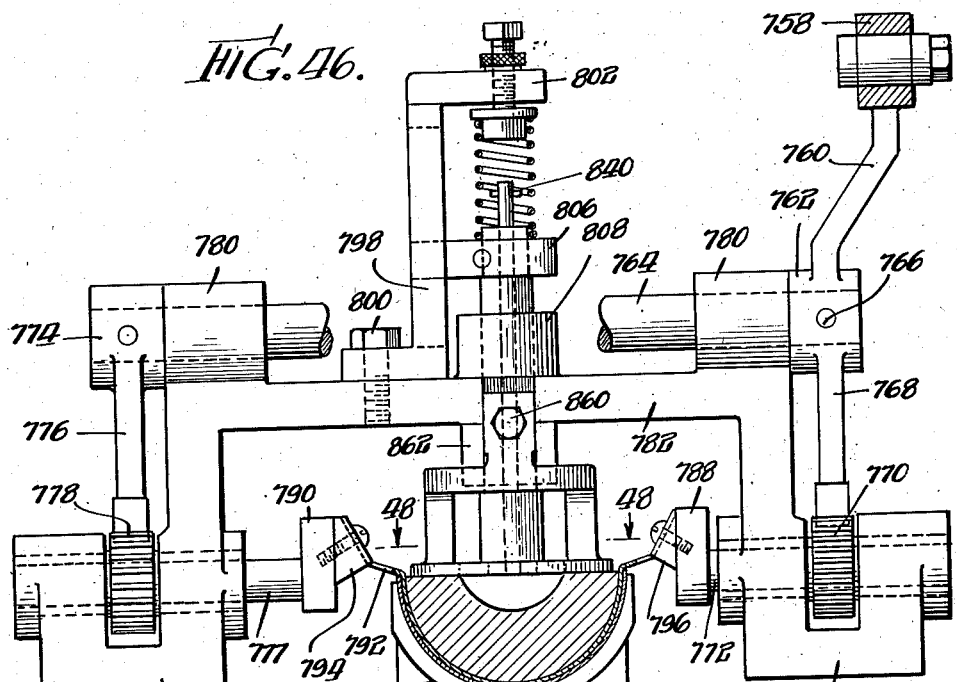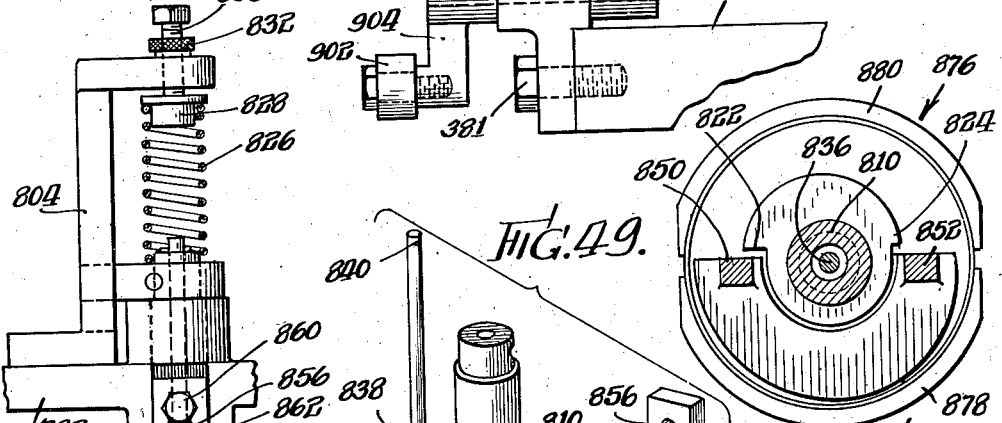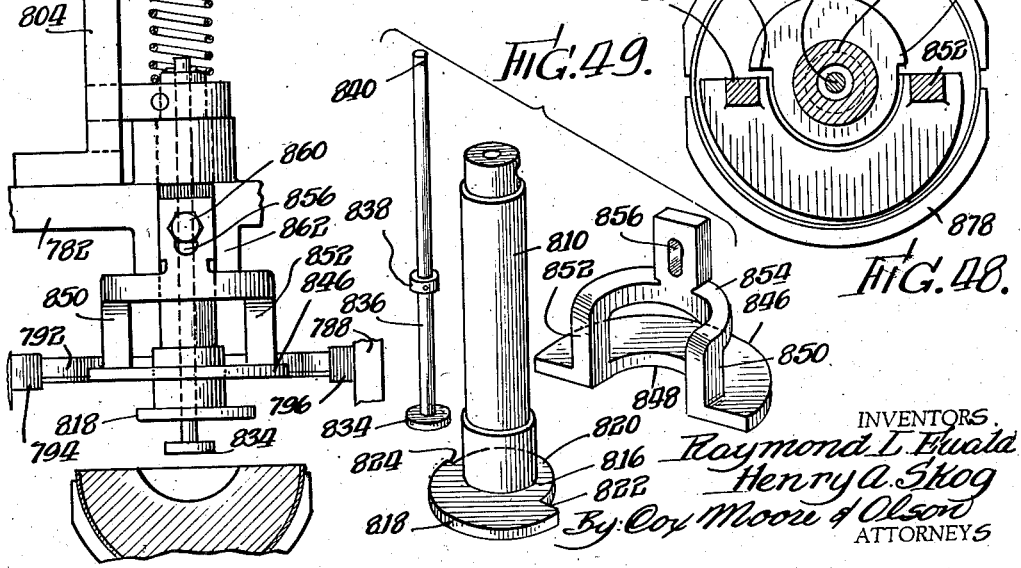

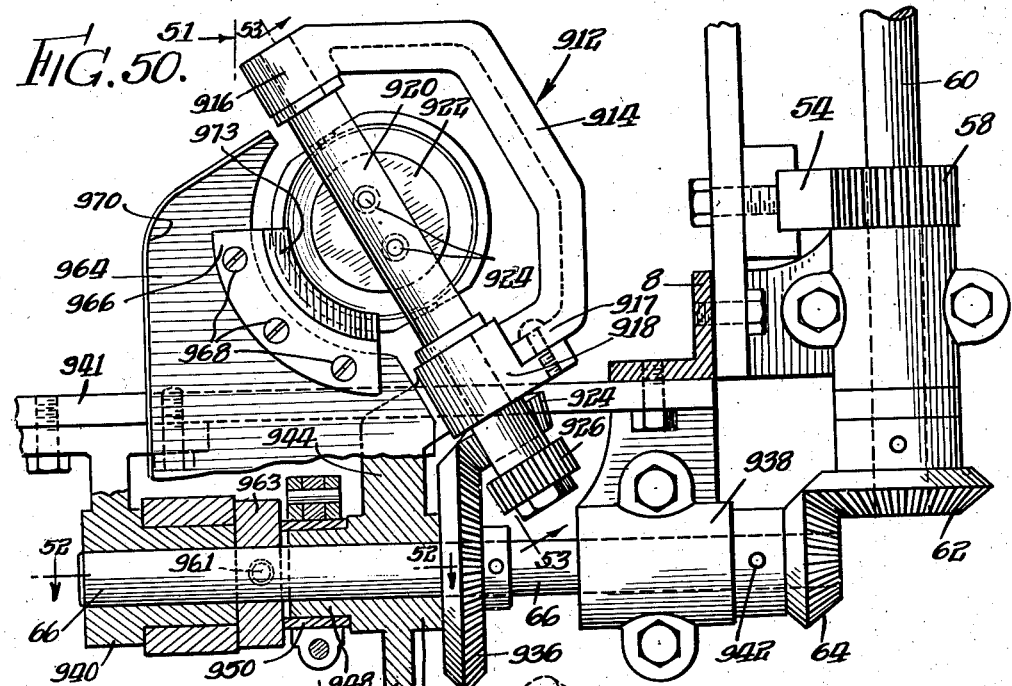
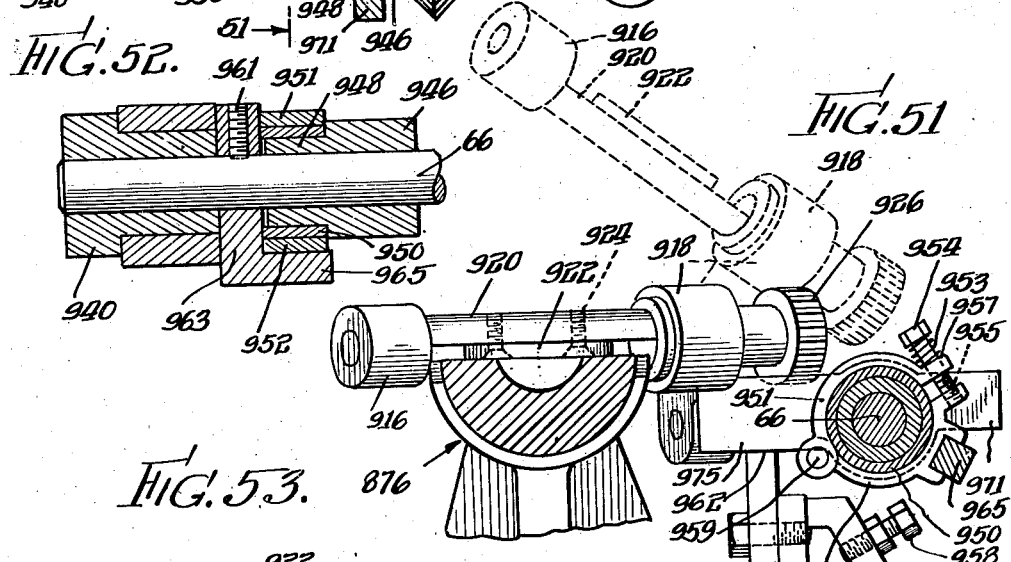
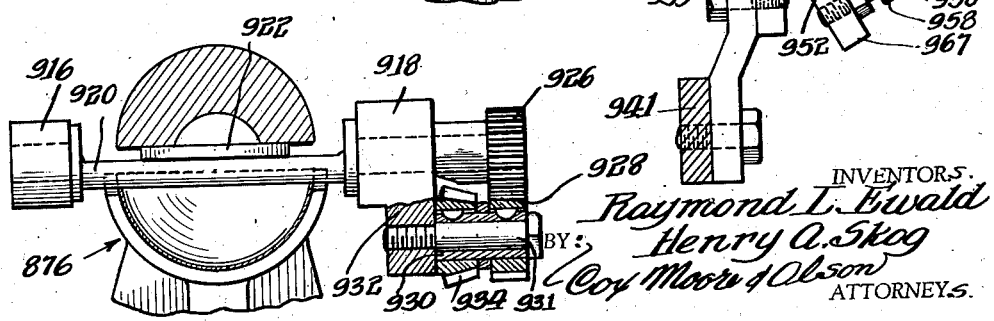

Patented Apr. 23, 1946

2,398,780

UNITED STATES PATENT OFFICE 2,398,780

FRUIT TREATING MACHINE

Raymond L. Ewald and Henry A. Skog, Olympia, Wash., assignors to Special Equipment Company, Portland, Oreg., a corporation of Oregon Application October 31, 1940, Serial No. 363,596

46 Claims. (Cl. 146—33)

This invention relates to apparatus for processing fruit, and more particularly the invention relates to an apparatus for halving, peeling, and pitting peaches and other fruit, and particularly clingstone peaches.

The main and various ancillary features of the present invention are shown, for purposes of exemplification, in a single organized automatic machine adapted to halve whole fruits, specifically peaches, positioned therein one at a time, and wherein automatic mechanism is present for firmly holding each peach in precise position while the stem cavity thereof is peeled, and during which holding operation the peach is severed, and the severed halves conveyed to mechanism to deposit the separate halves into holding mechanism, wherein each half is first pitted, and thereafter peeled, and, subsequently, mechanism is provided for discharging the pitted and peeled halved fruit from the machine while retaining the peel in the holding mechanism, the peel being subsequently discharged at a scavenging station—all of the foregoing steps occurring in synchronous, sequential manner.

Certain of the aspects of the present invention are applicable broadly to any type of machine—automatic or otherwise—whereas certain other aspects of the present invention comprise improved details of construction on the machine disclosed in the copending application of Raymond L. Ewald and Henry A. Skog, Serial No. 185,332, filed January 7, 1938, now Patent 2,280,813, granted April 28, 1942.

Among the objects of the present invention are to provide a single automatic machine adapted to receive a succession of whole peaches, particularly clingstone peaches, which are preferably precisely positioned into holding mechanism of the machine by hand and wherein the mechanism of the machine thereafter substantially and immediately grasps a whole peach and retains it in this precise position for conveyance to mechanism for automatically processing the peach; to provide an organized mechanism for more precisely, firmly, and quickly handling a succession of peaches from the time each is positioned by hand into the machine to the time the peach is discharged from the machine after undergoing the various processing operations thereon; to provide means for correctly positioning the whole peach in the machine and maintaining control of the certain alinement of the whole peach in the machine relative to various mechanisms operative thereon whereby to secure the maximum efficiency during the successive operations on the peach while it is passing through the machine; to provide means for enabling an unskilled operator precisely to locate or position a whole peach in the machine in a manner such that the successive peaches will be uniformly, accurately positioned with respect to the successive mechanisms of the machine which operate upon each half peach; to provide a feeding mechanism adapted accurately to receive the whole peach in a position such that the longitudinal stem axis is inclined downwardly with respect to a horizontal axis, and whereby to hold the peach in such position during the severance of the peach into halves whereby each severed half may be thereafter positioned into oppositely and radially disposed cups in a manner which will entail a very simple depositing operation of the peach as compared to the former mechanisms herein before referred to; to provide a feeding mechanism for whole peaches adapted to eliminate all guesswork on the part of the operator, and to provide means whereby the operator merely places the stem cavity of a peach of elongated proportions in the fruit holder whereby the rounded body of the peach is adapted to lie against the under cutaway surface of the fruit holder whereby the flesh of the peach is alined and held in a manner so that a machine, such as a sawing machine, properly cuts through the elongated axis of the peach; to provide means for maintaining the severed peach halves in juxtaposed confronting position, and to provide additional transfer mechanism for grasping the two peach halves and shifting them to the main fruit receiving holders while said peaches are maintained in substantially the same precise relative position; to provide an improved whole fruit receiving means; to provide improved means for sawing the whole fruit while mounted and held in the whole fruit holding means; to provide mechanism for severing the whole fruit in half while the fruit is carried from the in-fed station to the transfer station of the mechanism; to provide transfer mechanism for transferring the fruit halves from the whole fruit turret to the main turret, carrying the half fruit holders; to provide improved means for severing the whole fruit in halves which means eliminates any tendency for the fruit halves to be shifted out of their precise position during the severing operation; to provide improved means for transferring the fruit halves to the spreading mechanism, which distributes the half fruit into the half fruit holders; to provide a shiftable dividing plate disposed between the fruit discharge station of the whole fruit turret and the half fruit distributors of the half fruit turret, which distributing plate is constructed and arranged along the line of severance between the half sections of the severed whole peach, and which is adapted thereafter to move with the transfer mechanism toward the distributing means and thereafter to return back to the whole fruit turret for cyclic operation; to provide means for clamping and holding each half fruit upon the vertical face of each half fruit distributing plate whereby to maintain the half fruit on the plate through movement of the plate from each fruit receiving to fruit discharging position; to provide means to automatically operate the clamping means associated with the fruit clamp in synchronism with the movement of the transfer jaws and/or the dividing plate; to provide means for automatically opening the clamping jaws associated with the distributing plate for permitting the positive discharge of each half fruit into the half fruit receiving means and in timed relation with the movement of the transfer mechanism and the movement of the turret mechanism; to provide improved mechanism for holding and processing peaches which are larger on one side than on the other, including mechanism for sawing such peaches into halves and firmly holding each unsymmetrical half during the sawing operation and during the transfer of each severed half to the subsequent station; to provide simplified means for preventing the peaches from sticking to the spreader or distributing plates; to provide means for preventing the peach halves from turning during the return of the saw after being split in two; to provide a completely automatic, synchronously operating machine for continuously passing a succession of whole peaches through the machine and whereby such peaches are automatically halved, pitted, and peeled, and then discharged from the machine separate from the pitting and peeling mechanism thereof; to provide these and other objects of the invention as will be apparent from a perusal of the following specification when taken in connection with the accompanying drawings.

Referring now to the drawings in detail:

Figure 3 is a section on the line 3—3 of Figure 1;

Figure 4 is a section on the line 4—4 of Figure 1;

Figure 5 is a section on the line 5—5 of Figure 3;

Figure 6 is a section on the line 6—6 of Figure 3;

Figure 7 is a section taken on the line 7—7 of Figure 3;

Figure 8 is a section on the line 8—8 of Figure 2;

Figure 9 is a section on the line 9—9 of Figure 2;

Figure 10 is a view similar to Figure 9 but showing the feeding mechanism in a subsequent position;

Figure 11 is a front view of the mechanism shown in Figure 10;

Figure 12 is a perspective view of the whole fruit feeding mechanism;

Figure 13 is a section on the line 13—13 of Figure 10;

Figure 14 is a section on the line 14—14 of Figure 8;

Figure 15 is a section on the line 15—15 of Figure 8;

Figure 16 is a perspective view of the upper jaws for holding the whole fruit;

Figures 17 and 18 are front views of these same jaws;

Figure 19 is a section on the line 19—19 of Figure 2;

Figure 20 is a section on the line 20—20 of Figure 19;

Figure 21 is a changed position of the parts shown in Figure 19;

Figure 22 is a changed position of the parts shown in Figure 21;

Figure 23 is a section on the line 23—23 of Figure 8;

Figure 24 is a perspective view of the mechanism for removing the peel at the stem cavity of the whole peach;

Figure 25 is a section on the line 25—25 of Figure 8;

Figure 26 is a view showing a changed position of the parts shown in Figure 25;

Figure 27 is a section on the line 27—27 of Figure 2;

Figure 28 is a front elevational view of the saw and the saw drive taken on the line 28—28 of Figure 27;

Figure 29 is a section on the line 29—29 of Figure 2;

Figure 1:
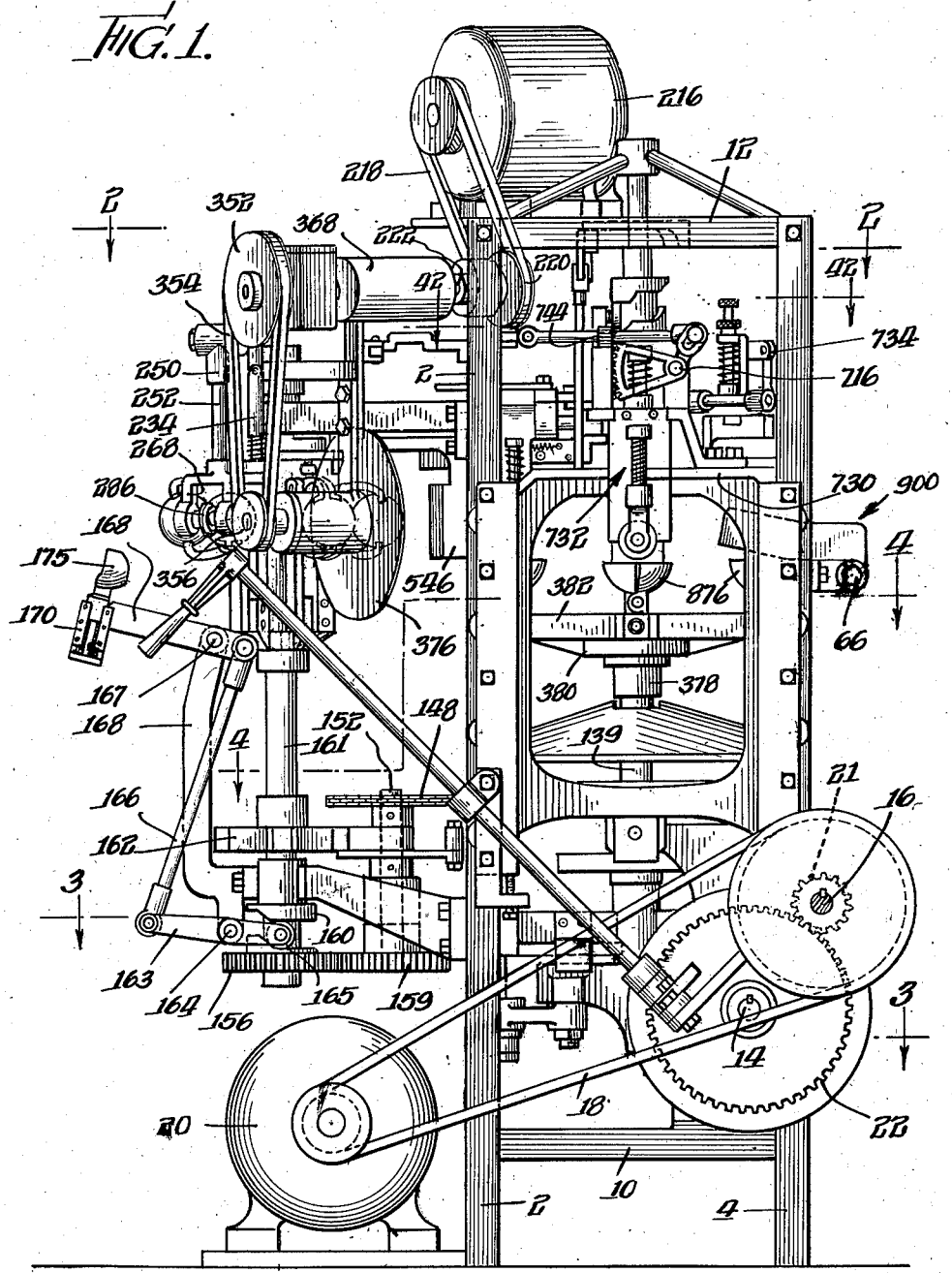
Figure 1 is a view of the machine from the pitting station.

Figure 30 discloses a changed position of the parts shown in Figure 29;

Figure 31 is a perspective view of the slide that operates the spreader blades;

Figure 32 is a section on the line 32—32 of Figure 30;

Figure 33 is a section on the line 33—33 of Figure 8;

Figure 34 is a perspective view of the shoe that lifts the gripper fingers;

Figure 35 is a detail view of the gripper finger operator;

Figure 36 is a section taken on the line 36—36 of Figure 33;

Figure 37 is a section on the line 37—37 of Figure 33;

Figure 38 is a view showing a changed position of the parts shown in Figure 37;

Figure 39 is a section on the line 39—39 of Figure 8;

Figure 40 is a sectional view taken on the line 40—40 of Figure 8;

Figure 41 is a section taken on the line 41—41 of Figure 39;

Figure 42 is a plan section taken on the line 42—42 of Figure 1;

Figure 43 is a side elevational view of the driving connections for the pitting device taken on the line 43—43 of Figure 42;

Figure 44 is a section taken on the line 44—44 of Figure 42;

Figure 45 is a section taken on the line 45—45 of Figure 42;

Figure 46 is a section on the line 46—46 of Figure 42;

Figure 47 is a view showing the changed position of the mechanism shown in Figure 46;

Figure 48 is a plan view taken on the line 48—48 of Figure 46;

Figure 49 is a perspective view of the peeling pad and ejector rod;

Figure 50 is a plan sectional view of the fruit ejector with portion broken away taken on the line 50—50 of Figure 6;

Figure 51 is a section taken on the line 51—51 of Figure 50;

Figure 52 is a section taken on the line 52—52 of Figure 50;

Figure 53 is a section taken on the line 53—53 of Figure 50; and

Figure 2:
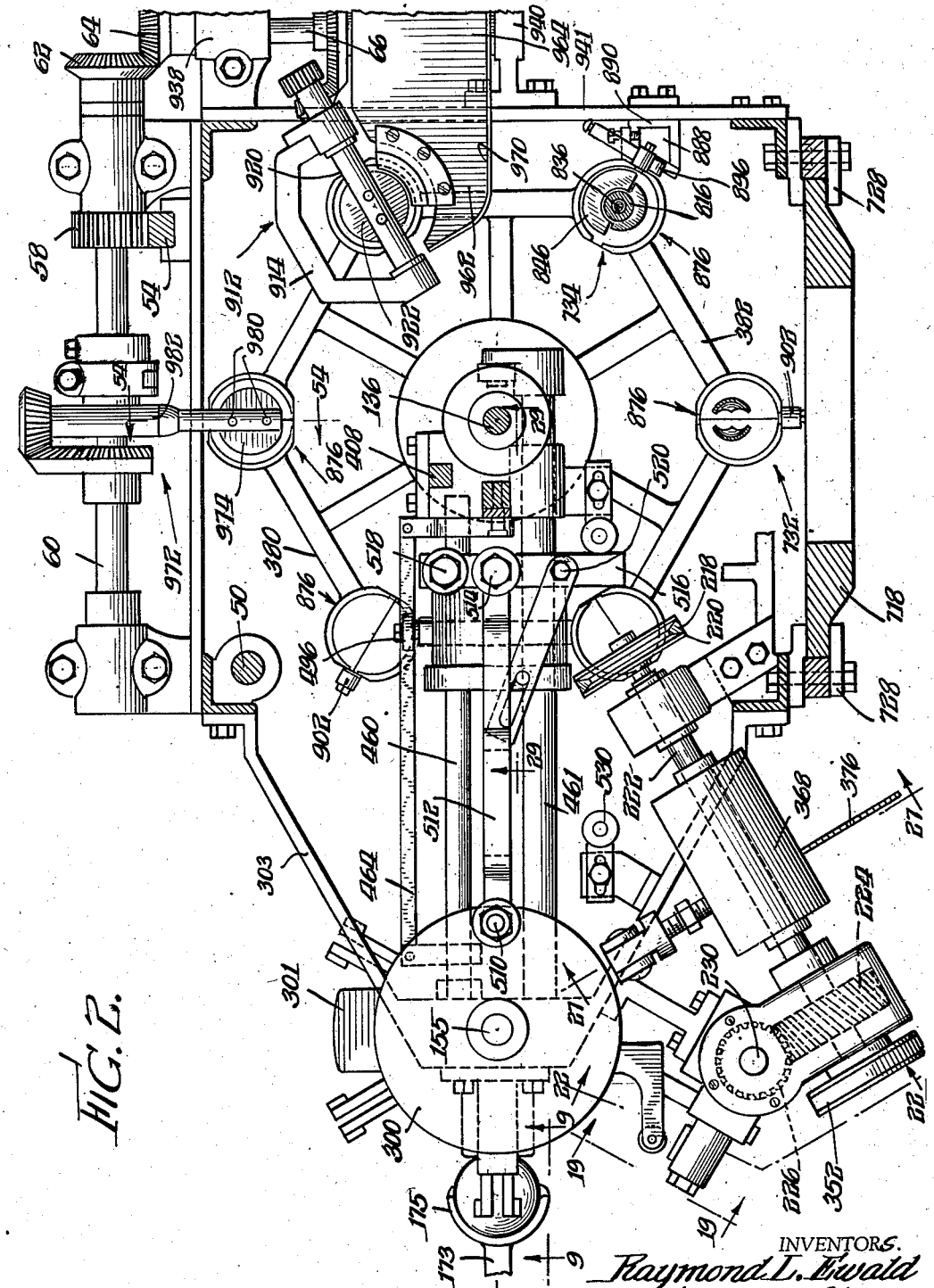
Figure 2 is a plan section taken on the line 2—2 of Figure 1.

Figure 54 is a sectional view of the scavenger paddle taken on the line 54—54 of Figure 2.

While the present invention is disclosed herein as generally in the form of and as an improvement upon the copending application of Raymond L. Ewald and Henry A. Skog, Serial No. 185,332, filed January 7, 1938, the invention of the present case is capable of many different embodiments and is not necessarily confined to the type of machine disclosed in the prior mentioned application.

Referring to the drawings in detail for a fuller exemplification of the invention, it will be seen that it comprises an automatic machine, power driven, and consisting in general of an upright main frame and an extension frame, the main turret carrying fruit holding means specifically in the form of substantial cup-like members, each adapted to hold a half peach. This main turret, as will be hereinafter set forth, is given ar intermittent movement by well-known Geneva mechanism, so that the cup-like members are successively brought to a sequence of stations spaced about the main upright frame. These stations comprise, first, a half fruit receiving station, whereby severed sections of peaches, specifically half peaches, are simultaneously deposited in pairs in adjacent cups in the manner hereinafter recited, and thereafter the turret is given a step movement to convey each cup with its contained half peach to a pitting station whereby the pit is severed therefrom. Subsequently said cup with the pitted half peach therein is conveyed to a peeling station wherein the peeling from the peach is severed; next two adjacent cups with the pitted and peeled half peaches therein are moved to a station, at which the processed half peaches are discharged from the machine, leaving the peelings in these cups; next the two cups with the peelings therein are moved to a scavenging station and there the peelings are removed from the cups so that the cups are ready when subsequently again moved to the first half peach receiving station each to receive another half peach from the spreader blades.

It will be understood that the half cups of the turret are successively conveyed past three various stations in rapid, intermittent order, and that, during the dwell in the movement of the turret the various processes hereinbefore set forth are carried out on the half peach. The extension frame which projects from the half peach receiving station projects laterally from the main frame and carries track or guide mechanism for the fruit transfer jaws, and also has mounted on its outer end a second turret which will be hereinafter referred to as the whole fruit turret. This whole fruit turret is provided with a series of spaced-apart fruit holding jaws and with cooperating, whole-fruit feeding mechanism, the latter being constructed to permit an operator to place a whole peach in precise and predetermined arrangement with respect thereto; whereupon it moves to carry the whole peach and position it in fixed relation to hold the fruit feeding jaws of the turret which has been brought into registering position therewith, whereupon the whole peach is then automatically grasped by these whole fruit holding jaws and, upon an intermittent movement of this latter turret, is then carried to a station where the peel at the stem cavity of the whole peach is cut away.

Next, the whole fruit turret moves intermittently to a subsequent station, where means is provided for severing the flesh of the peach and the pit in a plane parallel to its suture line, the arrangement being such that the severance is accomplished through the maximum diameter of the peach parallel to this suture line. After the peach has been severed while held in the whole-fruit feeding jaws, the turret next intermittently moves to the transfer station, which is in registry with the half-fruit receiving station of the first turret, as above described. At this instant the transfer jaws moving along the transfer track grasp the severed halves of the whole peach, and holding them in exactly the same position they were in at the moment of their severance, transport these two half peaches in a straight line movement toward the peach receiving cups; at this location means is provided for depositing each of the two severed half peaches into the cup in a manner to maintain the half peach in relation to the half fruit receiving cup in such a manner that the longitudinal axis of the pit of the half peach lies radially to a half fruit receiving turret, and the cup in which it is contained, so that the subsequent pitting and peeling operations may be exactly and precisely carried out. This sequence of operations on a peach is, in general, the same as takes place in the prior mentioned application of Raymond L. Ewald and Henry A. Skog; however, there are important differences, and they are substantially as follows:

First: In the present application the whole fruit, specifically a peach is fed into the whole fruit receiving jaws with its longitudinal pit axis inclined angularly, downwardly from a line horizontally passing through the axis of the whole-fruit feeding turret and the whole-fruit receiving jaws which firmly grasp and hold the peach in this position while the peach has the stem cavity peeled therefrom and also while the peach is severed or split in halves and transported to the transfer station. The peach is thereafter abducted by the transfer jaws which remove the fruit halves from the whole-fruit receiving jaws and hold them in this exact position while transporting them to spreader mechanism, which is arranged to deposit the halves in the adjacent cups. By feeding the whole peaches in the manner just described the necessity of providing means for giving the spreader mechanism an additional angular shifting movement, as disclosed in the prior mentioned application, is eliminated. In short, the peaches being conveyed in a manner herein described, are transported onto the spreader plates which shift merely from a vertical to a horizontal position, properly to position the half peaches in the cups radially disposed on the turret.

Second: An entirely new mechanism for feeding the whole fruits to the whole-fruit receiving jaws is provided, which makes for exactness and facilitates the feeding of the whole fruit to the whole-fruit feeding jaws in an accurate manner as demanded by the above described method of feeding.

Third: an entirely new mechanism for removing the peeling at the stem cavity of the peach is provided.

Fourth: A new means for adjustably and flexibly holding the whole peach on opposite sides of its suture is provided whereby a sawing or severing operation may take place completely through the flesh and pit of the half fruit while firmly held in precise relation.

Fifth: A new means and arrangement for severing the half fruit is provided in that the severing mechanism, specifically a high speed saw, is disposed to operate upon the whole peach while the whole peach is firmly held in the whole-fruit turret, by which means the precise position of the longitudinal pit axis of the peach with relation to the major axes of the feed turret and feeding mechanism is not disturbed during the severing operation.

Sixth: An improved means for transferring the severed half fruits from the whole-fruit turret to the half-fruit holding means on the half-fruit turret is provided.

Seventh: New means is provided for clampingly holding each half fruit on the exterior surface of a spreader plate so that, during the movement of the latter, from vertical to horizontal position, the half fruit is firmly held thereon; and in this connection means is provided for automatically operating this clamping means in synchronized relation to the movements of the associated mechanism whereby, as the spreader means comes into confronting, registering position with the half-fruit receiving means, specifically the cups, the clamping means is automatically disengaged to release the half fruit and to discharge the same into the half-fruit receiving means.

Eighth: In association with the means for peeling each half fruit there is provided new peeling pad mechanism adapted contactingly to engage the severed face of each half fruit and to hold same from tilting movement during the peeling operation; and this device is constructed and arranged to provide means for reinforcing the peripheral edge of the half fruit at which the peeling knife moves outwardly through the flesh of the fruit thereof, whereby to eliminate any tendency for the marginal portion of the flesh of the fruit to break off or to be cut or severed in a jagged manner during the peeling operation; and, in addition, this mechanism is arranged so that a portion of the holding means or pressure pad cooperates with the edge of the moving, peeling knife, so as to assist in the cutting movement. This construction has permitted the elimination of any necessity for locking the peeling pad in a downward position, thereby enabling a faster movement of this mechanism.

In connection with the peeling operation, a novel arrangement for controlling the movable section of the cup during the peeling operation is provided whereby the half peach is more easily pushed laterally in the cup during the peeling operation and in synchronized relation to the movement of the peeling knife.

In addition to the foregoing enumeration of differences over the machine of the prior filed application, there are numerous other improved details of construction, improved devices for handling the whole peach and half peach sections as they are automatically transported through the various operations of the machine, and the mere enumeration of the foregoing differences is not to be considered as complete, since many other novel arrangements of mechanisms are present, as will be hereinafter more fully pointed out in the following pages of specification and in the appended claims.

The invention of the present construction preferably takes the form of an upright, substantially square main frame comprising four corner posts or angle irons 2, 4, 6, and 8 (see Figures 1, 3, and 4), suitably braced at top and bottom by crossbraces 10 and 12. In addition, other hereinafter described cross bars serve as rigid supports for these upright members. In a general way, extending laterally from this rectangular frame projects a supplementary frame adapted to be bolted or otherwise attached thereto, as shown in Figures 1 to 4, inclusive, which supplementary frame is utilized to support the mechanism which initially receives the frame, the mechanism which severs the peeling at the stem cavity of the fruit, which severs the fruit in halves and which transports the severed halves to the pitting, peeling, fruit-discharging and peel-scavenging mechanism.

The main upright frame hereinbefore described is provided on a relatively low level thereof with horizontally disposed shafts 14 and 16, the latter being power driven through a clutch mechanism 17 (see Figure 3) by means of a belt 18 adapted, in turn, to be driven from any suitable motor 20. The clutch mechanism 17 is of any desirable construction capable of connecting and disconnecting the power source to the main operating shaft of the machine.

As shown in Figure 3, the shaft 16 carries a gear 21, driving another gear 22 on the horizontal shaft 14. This shaft 14 carries two main cams 24 and 26 fixed on opposite ends thereof. Each of these cams are double-faced so as to provide cam operating means on each side thereof. Cam face 24a comprises a cam track in which operates a hereinafter described roller on a vertically reciprocable slide for raising and lowering the main roll carrying slide 720 hereinafter described. The cam face 24b forms a roller race, in which a roller on a horizontally reciprocable slide 28 shifts in a horizontal motion transversely to the shaft 14. This slide carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 28 for operating the peeling mechanism hereinafter described.

The cam 26 of the shaft 14 has a cam face 26a forming a cam race, which operates a roller, connected to and operating a horizontally reciprocable slide 38, as shown in Figure 3. This slide 38 is also provided on its outer end with bearing 40 having a vertical pin 42, to the lower end of which is pivoted a link 44. This link 44 carries at its outer end an arm 46, the outer bearing 48 of which is pinned to a vertical oscillatable shaft 50, which is mounted in the corner post 6 of the frame opposite the vertical shaft 36. This shaft 50 has affixed to its upper end an arm hereinafter referred to, which, in turn, pivotally connects at its outer end to a relatively long rod running diagonally across to a universal connection which is, in turn, connected to a mechanism that operates a sector gear reciprocable about a horizontal axis for operating the mechanism which actuates the pitting knives, all as will be hereinafter set forth.

Cam race 26b operates a vertically reciprocable slide 52 (see Figure 6), the upper end of which is provided with a rod 54 having a rack tooth portion 56 operating a pinion 58 on a horizontal shaft 60. This shaft 60 has on one end a bevel gear 62 which, in turn, operates bevel gear 64 on shaft 66 having bearings on the outside of the vertical frame member and on the same level as the main fruit cup turret hereinafter described, which turret is above that lower level of the machine at which the shafts 14 and 16 are located. The shaft 66 operates the mechanism for positioning the auxiliary fruit holding means, specifically the pad over the fruit cup, for holding the half-fruit from tilting during peeling and also for oscillating the fruit-discharging means, ejecting the processed half fruit from the machine. These mechanisms will be hereinafter more fully set forth.

A second level of the main rectangular frame of the machine bounded by the uprights 2 to 8, inclusive, provides the location for the Geneva gears for driving the main or half fruit-holding turret, and also the whole-fruit turret, including the driving means therebetween, whereby the main or half-fruit holder turret is driven at twice the speed as the whole-fruit turret. To effect this function, the shaft 14 carries between its ends a bevel gear 110 (see Figure 3) meshing with a bevel gear 112 on a vertical shaft 114 mounted in the bearing 116 carried by a cross frame 118. This cross frame is supported at one end by suitable vertical brace connected to a cross bar 120 (see Figure 7), in turn carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantial triangularly shaped supplementary frame carrying the whole-fruit turret.

As shown in Figure 7, shaft 114 carries a bevel gear 112 and also carries above it a gear 128, which latter meshes with a second gear 130 on a bearing 132 on the cross frame 118. Gear 130 meshes with the larger gear 134 horizontally fixed on vertical shaft 136 having a bearing in cross-frame 118. Turret shaft 136 is surrounded by a bearing 138, above which is a long sleeve 139, along which is fixed a Geneva gear 140 having slots cooperating with a Geneva member 142 on shaft 114. This latter Geneva member 142 has a circular periphery on which is mounted roller 144 for cooperation with the radial slots of gear 140 aforesaid for intermittently rotating sleeve 139 and for holding it stationary between partial turns. The upright shaft 114 above the Geneva member carries a sprocket gear 146 (see Figure 7) driving a chain 148 running horizontally across the frame of the machine to a larger sprocket 150 fixed to shaft 152. This shaft is mounted upon a substantially triangular frame 153 carried by and integral with the cross bar 126. The frame 153 carries a bearing for the shaft 152, and also has a heavy extension bearing 154 for the whole-fruit turret shaft 155. Both of these shafts are vertical and parallel to each other. The whole-fruit turret shaft 155 extends vertically upward toward the top of the frame. The shaft 152 has pinned thereto just above the bearing 153 a part 157 of the Geneva, this part carrying the roller 158.

In addition, the shaft 152 has pinned below the support 154 a gear wheel 159 which meshes with another gear 156, which is pinned to the bottom of the shaft 155. Just above the gear 156, cam 160 is pinned to shaft 155, and above the bearing 154 the shaft 155 carries a relatively long sleeve 161 to which is keyed the cooperative part 162 of the Geneva, whereby, through the intermediary of the Geneva 162, the sleeve 161 is intermittently rotated. Sleeve 161 carries the whole-fruit feed turret.

*Whole fruit feed station*

Means is provided whereby an operator may feed whole peaches one at a time to the whole-fruit holding mechanism carried by the whole-fruit turret, and such mechanism comprises automatically shiftable means preferably including a concave receiver, into which a whole peach is placed by the operator, so that the stem axis and suture of the half fruit is precisely and definitely located with respect to this receiver, whereby, upon the shiftable operation of this feeding mechanism or receiver, the whole peach is automatically conveyed to whole peach gripping means preferably in the form of spaced fingers or jaws which are adapted automatically to grip the whole fruit adjacent and on substantially opposite sides of the suture plane of the whole fruit, and thereafter firmly to hold the whole fruit in the precise position in which it was placed in the first mentioned whole-fruit receiving means. Thereafter this whole-fruit gripping means is turned by the turret mechanism carrying it to a plurality of stations provided with mechanism for operating upon the peach while thus precisely held.

Direct positioning of the whole peach in the machine and the maintenance of control of a certain alinement with respect to the suture and stem cavity is very important for efficient results obtained from successive processing operations on the peach while it is fed through the machine. It is undesirable to provide feeding mechanism which gives the operator any particular leeway in properly placing the peach in the feeding jaws of the whole fruit turret, and therefore the hereinbefore described means is provided for eliminating all chance and guesswork by the provision of means whereby the operator merely places the stem cavity of the whole peach over a locating means, and in the construction of the whole-fruit receiver with concaved walls, whereby the rounded body of the peach automatically alines its suture, so that subsequent operations may be exactly determined.

To this end therefore mechanism for feeding a whole peach to the fruit holding mechanism of the whole-fruit turret is illustrated as an arm 163 pivoted as at 164, and provided with a roller 165 which works in the cam slide of the cam 160. The outer end of the arm 163 has pivoted thereto an elongated arm 166, the upper end of which is pivoted as at 165, to a lever 168 pivoted at 167 to an extension frame or bracket 169. This bracket 169, see Figures 1, 10, and 11, is made adjustable. The lever 168 carries on its outer end a guideway 170. The guideway 170 is disclosed more in detail in Figures 9, 10 and 13, and is arranged so that a block 171 is slidable therein, being normally and resiliently pushed to upward position by means of a spring 172. The outer end of the slide carries the whole-fruit receiver or cradle 173 shown in detail in Figure 12. This receiver includes a substantially centrally located stem cavity positioning means 174, which is elongated as shown, and is designed to fit within the stem cavity of the whole peach.

In addition, on opposite sides thereof, the cradle is provided with concaved or rounded walls 175 which are substantially cup-shaped. These walls at the rear are cut away as shown at 176, so as not to interfere with the opening and closing movements of the lower whole-fruit holding fingers or jaws, as shown in Figure 10. It will be noted that the lever 168 is arranged so that, when in position to place the half fruit between the holding jaws hereinafter referred to, the stem axis of the whole peach is angularly disposed with respect to a horizontal line passing through the center of the whole-fruit receiving means. Specifically the stem axis is downwardly inclined about 30 degrees to such line. This is particularly important because, as the whole fruit is carried by the gripping means of the whole-fruit turret, it must be maintained in this exact position.

The spring 172, by reason of its resiliency, permits some latitude in the positioning of the whole fruit with respect to the stationary support of the whole-fruit receiving jaws, as hereinafter set forth, so as to accommodate fruits or peaches of different sizes.

Referring now to the turret proper and to the fruit holding jaws, it will be observed that the intermittently rotatable sleeve 161 carries an additional sleeve 177 and affixed thereto are a plurality of post supports 178, such supports being radially spaced around the central vertical axis of the turret. Each one of these supports 178, in turn, is provided with an upright extension upon which the whole-fruit holding jaws are mounted. By reference to Figures 8 to 18, inclusive, the construction and operation of these jaws will be apparent. The lower jaw 181 is pivoted as at 180 to the upright 178. This lower jaw is formed with two integral spaced-apart jaws or fruit gripping fingers 181, which have concaved portions 182 and 183 adapted to engage the curvilinear contour of the whole peach on opposite sides of a plane passing substantially vertically through the plane of the suture, as shown in Figures 17 and 18.

In addition, this lower jaw 181 is provided at its rear end with an angularly disposed tooth projection 184, and is provided with a connection 185 with a coil spring 186 as hereinafter set forth. The upper jaw is made in two pieces, whereas the lower jaw is preferably made in a single piece. The details of construction of the upper jaw are shown in Figures 15 and 16. This upper jaw comprises a head portion 187 centrally apertured as at 188. The head is provided with a lateral lug 189 hereinafter referred to, and with an operating roller 190 on its upper portion, and a laterally extending tooth arm 191, the teeth of which mesh with the teeth of the arm of the lower clamping jaw of the whole-fruit holding mechanism. In addition, the head portion 187 is provided with a laterally extending fruit clamping jaw 192 having a curvilinear fruit contacting face 193 for engaging the contour of the peach on one side of the plane of the suture. In addition, this jaw is provided with an upstanding lug 194, to which the upper ends of the spring 186 connect. The cooperative part of the upper jaw is formed with a round bearing 195, which easily fits within the opening 188 of the head 187 to permit relative angular movement between the parts. This head is provided with a furcation in the form of a rearwardly extending lug 196, which is adapted to receive the lug 189 therebetween that is formed on the cooperative portion of the first portion of the upper gripping jaws. In addition, this part of the jaw is provided with a forwardly extending gripping portion 197, which is arcuately curved as at 198 to grip the contour of the peach on the opposite sides of the suture planes, as shown in Figures 17 and 18. The furcation 196 and the cooperating lug 189 provide a lost motion connection, which permits two portions of this upper jaw to have vertical adjustment, as shown in Figures 17 and 18, whereby in event a peach is held, which is of smaller diameter on one side of the suture plane than the other, the upper gripping jaw will adjust itself accordingly, whereby to hold the peach precisely a sit is inserted between these jaws when they move together under the tension of the closing springs 186. There are a pair of springs for each jaw—one on each side of the vertical plane through the central portion of these jaws—the upper springs being attached to the pins 194, and the lower ends of the springs being attached to the pins 185 of the lower jaws. It will be noted that the holding portions 181 of the lower jaws and the portions 192, 197 of the upper jaws are spaced apart to permit the entry of the saw therebetween, so that the saw may completely sever the entire peach and its pit while held in these jaws. It will be further noted that this space between these fingers 181 and 192 and 197 lies in the suture plane of the peach, which is approximately the plane of the maximum diameter of the peach, and parallel thereto.

Means for operating the jaw mechanism of the whole fruit holding means comprises a cam 200 which is splined to the upper end of the shaft 155. This cam is provided with an internal camway adapted to receive a roller 202 mounted upon a slide 204 disposed immediately beneath the cam and lying transversely across the shaft 155. The slide is suitably slotted as at 206 (see Figures 8 and 14) to permit movement of the slide back and forth transversely across the axis of the shaft 155. The slide is adapted to move in guideways 208 fixed to the extension support of the machine. The bottom portion of the slide is provided with two depending lugs forming extensions thereon. These lugs are 180 degrees apart. The cam race 202 of cam 200 extends 360 degrees of a total annular travel of the cam. When the slide 204 is moved toward the feed-in station, i. e., away from the main or half-fruit turret, the depending lug nearest the main turret moves toward the feed-in station, and thereby pushes the roller 190 on the top of the upper finger of the corresponding whole-fruit jaws inwardly toward the shaft 155, thereby positively to open these fruit jaws. Simultaneously, the opposite lug 210, which is spaced 180 degrees therefrom, moves in the same direction to permit the spring 186 to close the oppositely located fruit clamping jaws about or into engagement with a peach positioned by the fruit-receiving saddle 175, and thereby hold the whole fruit firmly between the fingers of the jaws. Any variations in size of successive peaches are automatically compensated for by the yielding action of the springs 186 between the upper and lower clamping jaws, and any deviations in size on opposite sides of the plane of the suture of the peach are compensated for by the relative movement between the members of the upper fruit jaw.

The upright 178 on turret 177 has rigidly bolted thereto as at 212 a laterally projecting backing member 214, which is shaped as shown in Figure 8 thereby to position and firmly to hold the rear portion of the peach positioned between the clamping jaws by the whole-fruit receiver 175.

By reason of the foregoing construction, the whole-fruit turret is intermittently rotated to position each pair of fruit holding jaws at the receiving station, during which time the jaws are automatically held in open position while a whole peach is fed onto the peach-receiving cradle 175 in a manner hereinafter set forth, and thereafter the receiver 175 is moved upwardly to position the peach, as shown in Figure 10, during which time the upper and lower jaws of the clamping members are cam released so as to resiliently approach the peach to grasp and hold it firmly and precisely in the before described predetermined position.

At the same time that the turret is moved, the shaft 155 is synchronously driven to operate automatically the cam and slide hereinbefore mentioned to cause these proper opening and closing movements of these jaws in timed relation.

Further referring to the foregoing mechanism, once the whole peach is placed manually with its stem cavity registering with the positioning nib 174 of the fruit cradle, as illustrated in Figure 9, the whole peach will thereafter be raised upwardly to the position shown in Figure 10, with the stem axis downwardly inclined from the horizontal, as therein shown. At this time the whole-fruit jaws firmly grasp the fruit as hereinbefore set forth, whereupon the fruit-receiving cradle moves downwardly, the turret then automatically shifts to the stem cavity trimming station; and at the same time an empty set of whole-fruit holding jaws is brought into registration ready for the next upward movement of the whole-fruit receiving cradle.

At the stem cavity peeling station means is provided for removing the peeling in the stem cavity of the whole peach. The present mechanism is designed efficiently to remove the peeling from the stem cavity of the whole peach, which is of elongated shape. Experience has shown that in the majority of peaches these stem cavities are of this shape and not round. In the present instance the stem cavity peeler is disposed to operate upon the whole peach while the latter is held in the whole-fruit turret, and is the first station of the mechanism operable upon the whole peach while in the holding jaws of this first turret. The mechanism for removing the stem cavity peeling is shown in Figures 19, 20, 21, 22, 23, 27 and 28.

Referring particularly to Figure 1, mounted on the top of the frame 12 is a motor 216, which drives a belt 218 to pulley 220 on the shaft 222 (see Figure 28). This shaft, in addition, carries a worm gear 224 driving another gear 226 (see Figure 20) on a vertical shaft 230. This shaft 230 is connected by means of a universal joint 232 to a telescopic shaft arrangement 234, which has pinned to the lower portion of the telescopic shaft arrangement a bevel gear 236. This telescopic shaft arrangement includes a driving key 238 of usual construction, and a spring 240 whereby to cause the bevel gear to be driven from the shaft 230 while permitting relative reciprocation of the movable portions of the telescopic shaft, and while at the same time permitting a swinging movement of the cutter mechanism driven by the bevel gear 236, as hereinafter set forth.

In addition to the telescopic shaft 234, there is provided a swinging frame arrangement adjacent thereto comprising a bracket 242 rigidly mounted upon a support portion 244 of the main frame. This bracket 242 includes an upstanding pin-like bearing 246, upon which a hub portion 248 of a mounting is adapted to oscillate. This hub portion 248 has a depending socket 250 having a depending shaft 252 affixed thereto as at 254. The bottom portion of this arm has slidably, adjustably affixed thereto a carriage 256 (see Figure 21). The upper portion of this carriage is provided with a smaller sleeve 258 carrying a pin 260, on which a pair of rollers 262 are mounted. The lower portion of the sleeve carries a ring-like member 264 having a depending bracket 266, which, as shown in Figure 20, comprises arms 268 and 270 and a sleeve-like support 272 for the bottom portion of the telescopic shaft 234. The central arm 270 has a lower portion 276 forming at its bottom end a bearing 278 for the bottom portion of the telescopic shaft arrangement 234. Mounted in the arms 268 and 270 of this lower carriage is a shaft 280, to which is affixed a bevel gear 282 for driving the same from the bevel gear 236. Also mounted upon this shaft 280 between the arms 268 and 270 is the peeling cutter arrangement comprising stem cavity gauge 283, preferably formed as a wheel or disk, and having oppositely disposed hubs 284 which are loosely mounted upon the shaft 280. This gauge wheel 283 is rotatably mounted so that it can roll down into and out of the stem cavity, carrying with it a pair of rotating cutter blades 288 and 290. By thus mounting the disk, sawing or cutting of the fruit is prevented. Adjacent each hub 284 is a collar 285 and 286, which are keyed to the shaft 280 and form a support for the above mentioned cutter blades 288 and 290, which are of the general configurations shown in the drawings, and are attached to the collars 285 and 286 by means of the screws 292. It will be noted that the cutter members are staggered 180 degrees, so as to counterbalance the high speed rotation of the cutter shaft. Each cutter comprises generally concaved portions 294 on opposite sides of the gauge wheel as shown in Figures 24 and 20, and because of this opposite arrangement of these concaved portions of the cutters in combination with the gauge wheel 286, which is adapted to roll in the central portion of the peach cavity, the cutters as they rotate will completely and precisely cut and sever the peel from the stem cavity.

Means is provided for oscillating the cutter about its swingable bearing pin 246, and, in association therewith, there is provided a cam mechanism to give the cutter a definite swinging movement. By reference to Figures 2, 21, and 25, it will be seen that means is provided to place the stem cavity peeling cutters in position so as to rotate and cause a swinging movement resiliently inwardly toward the stem cavity of the peach, and also a positive displacement movement away from the stem cavity of the peach and/or substantially up-and-down or vertical, reciprocatory movement longitudinally of the longer axis of the stem cavity.

Referring particularly to Figures 8 and 25, mounted upon the whole-fruit turret shaft 155 at the top thereof is a cam 300 which is pinned to shaft as at 302. This cam is provided with a camway 304 shown also in Figure 25. Slidably mounted transversely of the shaft 155 is a slide 306, which is slotted as at 308 to permit such movement of this slide. Such slide carries on its upper surface a roller 310 which operates in the cam slide 304, whereby upon rotation of the shaft 155, the slide is reciprocated in the manner shown in Figure 25. This slide at one end carries an operating arm 312 provided with a roller 314. This roller is adapted to contact a vertical plate-like member 316, which is mounted upon the pivoted member 250, which swings with the assembly. A depending arm 318 having a cam portion 319 formed on its lower end, is pivotally mounted at 320 on the rigid portion of the support 242, and it is provided with an inwardly extending shorter arm 322 adapted to be disposed between upper and lower screws 324 and 326, and by means of their adjustment are adapted to determine the position of the cam portion of the arm 318, whereby to determine the adjustment of the movement of the cutter as it approaches the peach stem cavity. Cam member 318 prevents the cutters contacting the jaws 191, if no fruit be therebetween. The foregoing roller 314, in cooperation with the plate 316, positively forces the cutter out of contact with the stem cavity so as not to interfere with the movement of the whole-fruit turret and the whole-fruit holding means. On the other hand, a coil spring 328 has one end attached as at 330 to a ring 332 pinned to the depending sleeve 256, and has its opposite end fixed to a pin 334 on an actuatable arm 336 in turn fixed to an oscillatable shaft 338 hereinafter referred to, whereby the spring 328 constantly tends to draw the swingable stem cavity cutter toward the peach when the slide 312 and its roller 314 swings to the left, as viewed in Figure 19.

In addition to this movement, means hereinbefore referred to is provided for raising and lowering the cutting mechanism in synchronized relation to the inward swinging movement of the cutter toward the stem cavity. This is accomplished by the mechanism in Figures 19, 21, 22, and 23. By means of this arrangement, when the rod 252 is shifted by the roller 314 on the slide 312, and by means of the spring 328, it will shift the entire frame or support 266, which carries the cutter head, while at the same time the sleeve 256 carrying the cutter head may be shifted vertically with respect to the rod 252, due to the slot and block arrangement therebetween. The means for vertically raising and lowering the sleeve 256 carrying the cutter head comprises the bar 336 hereinbefore described, which, when actuated, is adapted to raise and lower the sleeve 256 by means of contact with one of the rollers 262 thereon. The shaft 338 that actuates the bar 336, as shown in Figure 25, is provided at its opposite end with a roller 348, which is shifted by a cam 452 mounted on the shaft 136, as shown in Figure 23 of the drawings. Likewise, the rod 234 will be raised and lowered vertically with respect to the sleeve 243, and it also will be retained in vertical alignment by the abutment 238 riding in the slot formed on the sleeve 243.

If desired, the means for giving the carriage 256 a vertical, reciprocatory movement, may be omitted, and merely the swinging movement may be imparted to the carriage. It is preferred, however, to give the combination of movements. It will be appreciated that, inasmuch as the elongated stem cavities of successive peaches vary in length and depth, the gauge wheel is provided to roll down through the cavity, allowing the opposed cutters to do the peeling, regardless of the length or depth, and in conformity with the shape of the stem cavity. The vertical movement and the swinging or oscillatory movement are independent of one another but in timed relation.

*Means for sawing or severing the peach in halves*

Means is provided for sawing the flesh of the peach and the pit into halves, and particularly for sawing the same in a plane parallel with, and preferably through, the plane of the suture of the peach. This means is constructed so that, when the sawing operation is carried out, the severed halves of the peaches will not be turned by the rotating saw prior to being positioned on the spreader wings, whereby a simple pivotal movement of the wings serves properly to position the peach halves in the half-peach receiving cups. In order to insure control of the position of the half peaches during the sawing operation, the sawing station is disposed so that the saw is adapted to swing in and out at its station into contact and through the flesh and pit of the peach and while the peach is firmly held top and bottom by the peach holding jaws and by the backing member 214, whereby there is no chance for the peach to turn during the sawing operation.

As heretofore pointed out, peaches are very often larger on one side of the suture than the other, and since the peach must be held firmly and exactly positioned and held during sawing and while being shifted to the spreader plates, means is provided, so that the upper jaws can work independently within certain limits to take care of the difference in diameter of the two halves on opposite sides of the suture plane through which the cut is made. This adjustability is not necessary on the lower jaws because the side of the peach opposite the suture always presents a uniform, rounded surface.

The sawing mechanism is illustrated in Figures 1, 2, 25, 27 and 28. Shaft 222 (see Figure 28) is provided with a pulley 352 through and with a belt 354, which drives a second pulley 356 on a shaft 358 carried by and mounted in a carriage 360, supported on a swinging arm 362 adjustably mounted as at 364 on a depending arm 366 carried on a bearing member 368 concentrically surrounding the drive shaft 222. An adjustable connection 370 is connected with the depending arm 366, and is operated by a rod 372 actuated by the slide 396, as shown in Figure 27. The mounting member 360 is provided with ball bearings 374 and carries the saw 376, which is driven at high speed by means of the rotatable shaft 358.

*Transfer mechanism for the sawed halves of the peach*

After the peach is sawed at the sawing station, the two halves retained in sawed position within the whole-fruit holding jaws are moved by the turning of the whole-fruit turret to the next station, which is the fruit transfer station. At this station means is provided for grasping the two halves of the fruit with their cut faces in confronting engagement and for transferring them from the whole-fruit holding jaws to the half-peach or half-fruit spreading plates, which constitutes means for depositing the two halves of the peach into the half-fruit receiving means, preferably in the form of cups. Reference is had to Figures 1, 2, 8, 25, and 29 to 41, inclusive, for a proper illustration of this fruit transfer mechanism.

*The main fruit-holding turret*

Means is provided for holding the divided peach halves or sections in a manner so that such sections supported with their cut faces exposed may be subjected to one or more operations. As shown clearly in Figure 27, the saw in its high speed rotation is adapted to be oscillated by means of the slide mechanism to cut completely through the flesh of the peach and through the pit of the peach. In this connection it will be noted that the saw will pass into the kerfs formed in the peach holding jaws, and will, likewise, pass through a central kerf formed in the backing member 214, which, when the jaws 179 are in registration with the backing member 214, the kerf in the member 214 registers with the kerf in the jaws, so that the saw will in the innermost swinging movement take the position shown in the left of Figure 27, showing that the flesh and pit of the peach are completely severed. Figure 2 shows the cups and how the half fruits may be deposited and held therein with the longer pit axis substantially coincident with the radius line of a turret that passes through the substantial center portion of the half-peach fruit holder, whereby the axis of movement not only of the pitting means but also of the peeling means will lie approximately parallel to the longer axis of the pit, whereby the pitting, peeling, and discharge of the half fruit from the half-peach holding means is facilitated.

In the present instance, in order to carry out the foregoing, by referring to Figure 7, it will be noted that the sleeve 139 is disposed to turn inwardly on or about the main vertical shaft 136 and extends parallel about the Geneva disk 140. This disk 140 is affixed to the lower end of the sleeve 139. The upper end of the sleeve 139 carries a boss 378 (see Figure 1) having an upper disk 380, to which the bottommost spider of the fruit-holding turret 382 is adjustably bolted, the adjustment serving to provide angular adjustment of the fruit-holding turret relative to its turning sleeve, whereby to provide an adjustment for insuring that the half-fruit receiving and spreading wings or plates hereinafter referred to are in the properly close-together position at the time the fruit halves come onto the wings.

As clearly shown in Figure 2, the turret 380 is provided with a spider providing a mounting for the half-fruit receiving means hereinafter specifically shown as cups. There are six of these cups, each disposed with its center line located radially of the shaft 136. Directly surrounding the shaft 136 above the turret 380 is disposed a long sleeve 384 (see Figures 39 to 41). This sleeve forms a mounting for a plurality of devices. It is formed at its upper portion with a preferably integral outstanding projection 386 (see Figures 29 and 30), which faces toward the transfer jaws. Sleeve 384 provides a bearing for the inner shaft 136, and also provides a supporting bracket 390 for devices that operate the mechanism for releasing the clamps on the spreader plate for holding the half peaches thereon and hereinafter described. The upper end of the shaft 136 is provided with four cams which are keyed thereto. The cam 392 is provided with a raceway 394 which receives a roller 396 mounted on the end of a vertically reciprocating bar 398, which has pivotally connected to it a block 400. Directly above is a second cam 402 which has a raceway 404, which receives a roller 406 connected to a vertical bar 408, which has a bearing portion 410 on the sleeve 384. This bar 408 is provided on its lower end with a rack 412 which actuates a segment gear 592. This segment gear is formed on a horizontal shaft 584 and operates the spreader plates 418 hereinafter described.

Directly above the cam 402 on the shaft 136 is a cam 420 keyed to the shaft 136 and having a cam track 422, which engages a roller 424 on an arm 426, which is pivoted at 430 on a bracket 432, which is supported on the upper main frame 12 of the machine. The arm 426 has attached thereto a rod 434 connected at 436 to a lever 428. This rod 434 has at its lower end a threaded connection 438 to a block 440, which is pivoted on a pin 442, which is, in turn, threadedly connected at 444 to a cam bar 446. This cam bar 446 is provided at its lower end with a wedge-shaped end 448, which actuates a pair of rollers 450 and 451. In addition to the cams 392, 402, and 420 on the shaft 136, there is provided a cam 452, which actuates the roller 348 hereinbefore described.

Referring again to the vertical reciprocating slide 398, which carries the pivoted block 400, as shown in Figure 39, the block 400 slides between furcations 454 and 456 of an arm 458 keyed on a shaft 460. The opposite end of the arm 458 carries an offset portion 462, on which is rigidly mounted an elongated rail 464 extending parallel to the rail shaft 460.

Referring again to projection 386, as shown in Figure 25, it will be seen that it forms a support for the sleeve 461, and also forms guideways for the vertical bars 398 and 408. The bar 408 is held in position by a plate 466, which is bolted to the projection 386 by bolts 468. This projection 386 also forms a bearing for the inner end of the shaft 460.

A transfer jaw carriage 470 is composed of two parallel sleeves 472 and 474 connected at their opposite ends by castings 476 and 478 (see Figures 26 and 33). Rotatably mounted on sleeves 472 and 474 by means of concentric, surrounding sleeves 480 and 482 are two depending arms 484 and 486, which are interconnected by intermeshing gear sectors 488 and 490. Projecting from the side of a sleeve 482 is a lateral lug 492 carrying a roller 496 which engages the rail 464. Slidable on the rail 464 is a shoe 498 having a pin 500 threaded into its underside and depending therefrom. A coil spring 502 surrounds this pin between the shoe and a lug 504, which is screwed into the lower part of the arm 484. An adjustable lock nut 506 is threaded into the lug 504 and provides an adjustment to vary the tension of the spring 502, thereby providing an adjustable pressure against the lower part of the arm 484. The function of the spring connection is to permit the cam mechanism 392 and the arm 458 that oscillate the rail 464, to force the rail to its downward position even if the arm 484 is pushed outwardly due to the oversize or larger half fruit engaged by the cup on the arm 484. This spring 502 also serves to maintain a proper tension upon the jaws on the arms 484 and 486 to transfer the fruit (see Figure 33).

The upper surface of cam 300 is provided with a pin 510 providing a pivotal contact point for a crank arm 512, which pivotally connects as at 514 with a bar 516 pivotally connected as at 518 to the transfer jaw carriage 470. By means of this arrangement, the transfer jaw carriage is reciprocated back and forth on its guideways 460 and 461. This latter guideway 461 surrounds the shaft 338. In addition, the pivoted bar 516 has pivoted thereto as at 520 another bar 522, provided on its outer end with an elongated slot 524 adapted to receive a pin 526 on the opposite end of the carriage 470. Stop means for the bar 516 comprise a pair of rollers 528 and 530 each adjustably mounted on respective blocks 532 and 534 carried by stationary arms 536 and 538, respectively, on stationary portions of the framework of the machine. By means of nuts and slot connections 540 and 542, the positions of these stops may be varied for purposes of adjustment, as will be hereinafter more fully apparent.

The foregoing mechanism provides a lost-motion drive at the two opposite ends of the slot 524, which ends are adapted to contact the pin 526 with the carriage and move the latter oppositely—for instance, the crank 510 and the crank arm 512, when the crank is approaching in a direction whereat the transfer jaw is at the extreme right, as shown in Figures 8 and 25, will give too little added travel in this direction to the transfer carriage. This is due to the fact that the pivot pin 510 on the crank disk 300 is beginning to travel arcuately in a direction transversely to the longitudinal line of travel of the carriage. As the carriage approaches the ends of its respective line of travel in either direction, it is desirable at these points to give the transfer jaws time to open or close at the respective ends of travel of the carriage, and it is also desirable to make this additional length of travel adjustable in order properly and adjustably to position the half fruit into the cups at the innermost end of travel of the carriage; to-wit, shown to the right in Figure 8; also properly to position the transfer jaws at the outermost stroke of the travel of the carriage jaws, as shown to the right in Figure 8, and relative to the face of the whole-fruit holding jaws on the whole-fruit turret.

When disk 300 rotates in predetermined direction, the crank arm 512 is moved, so that through its pivotal connection 514 with the bar 516 pivoted to the transfer carriage at 518, the bar 516 is swung in a predetermined angular direction. And thus, through pivot 520 on the bar connection with the slotted link 522, the outer end of the slot 524 contacts the pin 526 on the transfer jaw carriage. And, since bar 516 cannot thereafter swing additionally in this same angular direction, the crank arm 512 still continuing to move in the same direction it was moving, now drives the carriage forward in the same direction from the position where the fruit is taken from the whole-fruit turret to the position as shown in Figure 26. The little further movement takes place after the carriage has reached the position as shown in Figure 26. This is accomplished through its pivotal connection 518, and also through contact of the outer end of the slot 524 with the pin 526 on the carriage.

As the carriage reaches near the end of its travel, the crank 510 and the arm 512 will impart but little added movement to the right of the carriage, due to the transverse major component of travel of the crank pin 510, as hereinbefore described. At this point, and also at the corresponding opposite position of travel of the transfer carriage, i. e., as the carriage reaches the extreme right, as shown in Figure 26, it is desirable to give the carriage an adjustable, additional travel. Therefore, at the position where the outer end of the bar 516 contacts stop 528, this stop forms a fulcrum, about which the bar 516 may swing. The reverse end of the bar is connected at 518 to the carriage at a greater distance from the fulcrum than is the pivot pin 514, which is the point of application of the power from the crank arm 512 to the bar 516. Hence, there is produced a power multiplying connection, as above described, which gives the transfer carriage 470 the added length of travel. At the end of this crank movement, the crank 300, as it continues, now carries crank pin 510 to the right to reverse the direction of travel of the carriage. As this occurs, the slot 524 moves relatively to the pin 526 until the lost motion has been taken up, at which time the carriage is pulled to the right by its connections, i. e., the pivot pin 514 and the opposite end of the slot 524 and the pin 526, and thereafter the same added travel is imparted to the carriage in the direction by the opposite stop 530 and the outer side of bar 516.

Transfer jaws

As the whole-fruit turret jaws 179 come to rest in registration with the horizontally shiftable flat dividing plate 546 (see Figure 8), which plate is horizontally movable along and beneath the two round carriage guides 460 and 461, as hereinafter referred to, these transfer jaws are in closed position about the confronting severed halves of the whole peach. The shiftable partition plate 546 at this time is faced about one to two inches from the periphery of the peach halves held by the jaws 179. The whole-fruit jaws are brought to this position as the transfer jaws are moving to the right (see Figure 8) in abducting the prior two halves to the spreader plates, for subsequent deposition into the fruit-holding cups of the half-fruit turret. The halves of fruit are deposited in a manner hereinafter recited, and the jaws are swung apart to open position, as hereinbefore set forth; and then the transfer jaw carriage starts its return movement to the left (see Figure 8), or toward the whole-fruit turret. As these transfer jaws come opposite to the two half peaches held in the whole-fruit turret jaws 179, the transfer jaws are swung inwardly resiliently by the shiftable track mechanism, hereinbefore set forth (see Figure 23). Being thus moved, the two opposite transfer jaws grasp the opposite halves of the peach. Thereafter, these jaws are again moved to the right (see Figure 8) toward the main turret. Before the start of this last mentioned travel, the whole-fruit jaws 179 open, and the whole-fruit turret moves counterclockwise one station. There are six such pairs of whole-fruit jaws.

As shown clearly in Figure 33, the transfer jaws comprise substantially semi-spherical shells 550 attached to the downwardly depending arms 484 and 486. These semi-spherical shells 550 are constructed so as to provide clearance for the turret jaws 179, so that the jaws 179 will hold onto the half fruit while the transfer jaws 550 are moved into position to contact the half-fruit. The jaws 150 are provided on their lower and upper edges with notches 552 and 554. These transfer jaws are cut away at the bottom as at 552 to allow the jaws 181 to reach up and contact the fruit. As the transfer jaws approach the whole-fruit holding jaws 179 at the extreme end of the transfer jaw carriage travel, the upper and lower cut-outs on the jaws register with the upper and lower fingers while the skirt of the upper transfer jaws engages the surface of the peach held in the upper and lower jaws.

The fruit stop 214 on the whole-fruit jaws has two purposes—one to assist in holding the rear end portion of the whole peach during the sawing operation, and, second, it also acts as a stop or gauge correctly to position the peach in the whole-fruit turret jaws. This stop is cut out in front to permit the edge of the saw to enter the same to make the full cut, as hereinbefore set forth, and is also concaved on each side as at 215 to permit the transfer jaws to close onto the half fruit after sawing and while held in the upper and lower fingers of the whole-fruit turret.

*Longitudinally shiftable dividing blade*

Means is provided during the transfer of the peach halves from the whole-fruit turret to the spreading plates, hereinafter referred to, first, to fill in the gap between these plates and the whole-fruit turret; and, secondly, also to cause the dividing plate to enter the severance made by the saw and while the two halves are still held by the jaws of the whole-fruit turret, whereby slightly to spread the peach halves apart to insure that each half passes onto a separate surface of the spreaders.

To accomplish these ends, it is necessary to move this dividing blade into position between the upper and lower fingers of the whole-fruit turret, and therefore the mechanism for accomplishing this and the mechanism of the dividing plate will now be described.

Referring to Figure 8, it will be seen that a bracket 560 attached to a stationary part of the machine supports a horizontal guidebar 562. Slidably mounted in the bar 562 is a slide 564. Secured to this slide is a downwardly depending lug 566 which carries the separator blade 546. A spring 568 creates the urge to hold the slide 564 against a stop 570. This normally tends to place the separator blade 546 in position just in front of the spreader wings hereinafter described. Now, as the transfer carriage 470 moves outwardly to pick up the next peach, a plate 582 (see Fig. 8) which is fastened to the cross member 478 of the transfer carriage, strikes against the lug 584. This causes the slide 564 to move along the slide bar 562. This, in turn, causes the separator blade 546 to enter the fruit between the two fruit halves, as shown by the position in dotted lines.

Now, as the transfer carriage carries the peach into the machine or toward the right in Fig. 8, the spring 568 pulls the slide 564 along with the peach until the slide is stopped against the stop 570. From here, the peach halves slide onto the spreader blades into position for being placed into the peeling cups.

The boss or projection 582 on the transfer carriage is on that part of the slide nearest the whole-fruit turret, so that the transfer carriage 470 has a movement toward the whole-fruit turret independently of the slide until the depending projection 582 on the carriage abuts the boss 584 of the dividing slide, and then moves the slide with the carriage toward the whole-fruit turret. A spring 568 normally pulls the slide back toward the main turret, i. e., to its position in front of the spreader wings. When the carriage retreats toward the main turret, the spring pulls the slide back toward the spreader wings. The stop 570 on the track limits the movement of the dividing blade to a position just clearing the wings.

Fruit spreader blades 574 and 576 are supported on upstanding vertical castings 578 and 580 (see Figures 8, 30, and 40) and are connected to these castings by tapered head screw 582. The lower end of the casting 578 is keyed to a horizontal shaft. Castings 578 and 580 have keyed to their lower portions short shafts 584 and 586, which are mounted in a bearing block 588 (see Figure 33), and the shaft 584 has formed on its opposite end segment gears 590 and 592 (see Figure 39). The gear 592 is adapted to mesh with the hereinbefore mentioned rack bar 412 and the gear 590 is adapted to mesh with a complementary rack bar, which is united to the first mentioned rack bar 412 by means of an intermediate block 596 and a long bolt 598 (see Figure 39), whereby, upon reciprocation of the rack bar 412, the rack bar 594 is likewise operable, whereby to oscillate the shafts 584 and 586 to operate the spreading mechanism shown in Figure 33. It is to be understood that these spreading plates are to be maintained in a vertical position in full lines in Figure 33 to the horizontal dotted line position shown in such figure, and whereby to overlie the half-fruit cups, into each of which a half peach is adapted to be deposited. Each spreader plate is provided with an outer face, which when in vertical position, is adapted to receive a half peach thereon. By oscillating the two spreader arms to the position shown in full lines in Figure 33, with their rear faces confronting, two peach halves carried by the transfer jaws, may be transported onto the outer faces of these spreader plates.

Means is provided to hold each peach half temporarily on each spreader plate during the time that each spreader plate is shifted from the vertical position down to approximately horizontal position; and also means is provided for releasing the fruit clamping means from each spreader plate, whereby to release the half peach therefrom for deposition into the underneath cup. Also each spreader plate is provided with means to prevent adhesion of the relatively sticky cut-face of the half fruit to the spreader plate.

The means for holding each half peach on each spreader plate, comprises a lower bar 600 having its front edge arcuately disposed and connected to each one of the spreader plates 574 and 576 by screws 602. This allows the half fruit to be moved onto the supporting bar 600, as shown in Figure 30. The upper portions of the spreader plates 574 and 576 have attached thereto short shafts 604 and 606 surrounded by collars 608 and 609, which, in turn, form a connection for the ends 610 and 611 of a torsion spring 612. The other end of the torsion spring is fastened to a collar, which, in turn, is pinned to the shaft 606. Collars 608 and 609, which are loosely mounted on the short shafts 604 and 606, form a bearing support for arms 616 and 618. These arms 616 and 618 form the upper holding means for each half fruit after they have been deposited upon the spreader plates 574 and 576, and have their lower corner surfaces disposed at an angle to the planes of the spreader plates as shown in Figure 33 to prevent the half fruit from being released from the spreader plates before the upper holding arms 616 and 618 are shifted to allow the release of the half fruit, as shown in dotted lines in Figures 37 and 38. Each spreader plate has a tapered entering edge 622 to allow the half fruit to be easily moved across the front surface. Three elongated, cutaway portions 624 are formed on the outside surface of each spreader plate to provide a means whereby the inner cut face of the half fruit will be prevented from sticking to the spreader plates 574 and 576 (see Figures 30 and 33).

Referring to Figures 29-30 to the upper peach clamping fingers 616 and 618, they have provided at their opposite ends lugs 626 which cooperate with releasing means hereinafter described. In addition, lugs 628 are formed on the upper surface of the holding arms 614 and 616, which cooperate with the depending lug 630, which projects downwardly below the surface of the slide bar 562 and is formed integral with a short bar 632, as shown in Figures 33 and 35. Formed on the opposite side in the end of the bar 632 is a roller 634 which is attached to the bar 632 by means of a bolt 636, threaded into the bar. As shown in Figure 29, the rail 562 has formed on its righthand end a horizontal slot 638 and in another end, slot 640 which is formed on an angle. Each slot is adapted to receive a bolt 642 which has its opposite end threaded into the short bar 632 as shown in Figure 33.

Referring again to transfer carriage 470, it has attached to its under-surface, as shown in Figures 29 and 33, a bracket 644 formed on its lower surface with a shoe 646, which has its forward end tapered upwardly as at 648, and its rear or lefthand end cut away at an angle as at 650. This shoe 644 engages the roller 634, which is attached to the bar 632 and at certain predetermined times raises and lowers this bar 632 to raise and lower the finger 630 that actuates the half-fruit holding arms 618 and 616.

Referring to Figures 29 and 30, it will be seen that, as the fruit transferring carriage 470 moves from the feeding turret on the left to the spreader plate 622, the bracket 644, which is attached to the upper part of the arm 484, as shown in Figure 33, will engage the roller 634, thereby depressing the bar 632, which will allow the bolt 642 to be moved downwardly at an angle in the slot 640, thereby actuating the finger 630 to contact the lug 628, which will, in turn, rotate the holding finger 616 and raise it to allow the half fruit to pass onto the spreader plate. Continued movement of the transfer carriage 470 will allow the shoe 646, formed on the bracket 644, to pass over the roller, as shown in Figure 30, which at that time allows the torsion spring 612 (see Figure 40) to exert a rotative force on the sleeve 608, which will permit the upper holding finger 616 to be released and clamp the fruit between the lower platform 600 and the beveled under-surface 620 of the upper holding arms 616 and 618. Upon the return movement of the transfer carriage 470, the arms 484 and 486 are open or spread, and the shoe 644 is out of the path of the roller 634, which allows the carriage to return to the left.

Referring to Figure 8 in describing the operation of the dividing blade 546, the associated spreader plates 622, the peach clamping mechanism associated with the spreader plate, and the cooperative fruit jaws 179: When the divider plate has moved to the position shown in the dot-and-dash lines, which is its outermost position, that is to say, nearest the whole-fruit turret, the plate lies about as shown in such dot-and-dash lines, so that approximately a little more than one-half of each peach half overlies this divider plate as the peach is held by the clamping jaws on the whole-fruit turret. At this time the transfer jaws also overlie the peach halves and are about to move inwardly to embrace the peach halves. The release of the peach halves by the fruit jaws 179 and the embrace of the peach halves by the transfer jaws is almost simultaneous. In this position the dividing plate has entered the kerf or line of severance in the peach halves, which has heretofore been made by the sawing mechanism. From this position just described, the transfer jaws and dividing plate now move together to the right, as viewed in Figure 8, in a direction toward the main turret which carries the half-fruit cups. The peach halves are carried between the dividing plate and the transfer jaws, the dividing plate lying between the peach halves and thus the peach halves are thus moved toward the spreader plates or wings. The dividing plate is brought to rest by the stop 570 in vertical registration with the vertically positioned spreader wings and almost in contact therewith. There is a slight clearance between the dividing plate and the forward edge of the wings so as to permit the wings to oscillate from such vertical position to horizontal position. At this time the wings are vertical and, since the dividing plate thus comes to rest, the transfer jaws continue to move to the right, as viewed in Figure 8, independently of the dividing plate to a position such that the transfer jaws are opposite to and laterally overlie the spreader plates, as shown in full lines in Figure 8. As these transfer jaws near the end of their stroke, the pivoted fruit-gripping or clamping finger 616 on the upper edge of each spreader wing is automatically caused to drop by spring means 612 and the upper end of each finger (there is a finger for each spreading plate) enters the upper notch of its respective transfer jaw to engage the upper edge of the peach half and hold it against the lower and horizontal ledge 600 on the base of each of the wings. This ledge 600 preferably extends at right angles to the outer wall or face of the spreader plate. The fruit clamping or gripping bar 616 is provided with an inwardly inclined face so as to exert a pressure inwardly against the rounded face of the peach, whereby to hold the half fruit on the wing. In short, the inner component of the wedge-shaped portion of each clamping bar 616 acts inwardly and downwardly against the vertical face of the wing and the ledge 600, whereby to hold the half peach firmly yet resiliently in vertical position thereagainst.

When the transfer jaws have moved to the position shown in full lines in Figure 8, they next move laterally outwardly, as shown in dotted lines in Figure 33. Subsequently they move with the carriage in a reverse direction toward the whole-fruit turret. However, this reverse movement does not start until the jaws have moved outwardly to clear the fruit on the wings. After the wing clearing movement of the transfer jaws has occurred, the wings are now actuated by the rack and sector mechanism shown in Figure 39, as hereinbefore described, to carry out a shifting from vertical position shown in full lines in Figure 33 to the dotted line position shown thereat.

In the down position, they are directly over the fruit cups which at this time, due to the timed intermittent movement of the half-fruit turret, have been brought into registration with and directly underlying the place where the half peaches are to be deposited by these wings. As the wings just about reach the horizontal or downward position, the dividing plate or blade 546 begins its travel toward the whole-fruit turret. The carriage 470 with the transfer jaws thereon has already started its motion toward the whole-fruit turret, and just about as the transfer jaws begin to get into proximity with the whole-fruit jaws, which in the present case means a movement of the carriage about four and five-eighth inches, the dividing plate then also starts to move with the carriage toward the whole-fruit turret. Thereafter the transfer jaws and dividing plate move together up to a position relative to the whole-fruit holding jaws, as shown in the dot-and-dash line of Figure 8. The dividing plate travels in this direction two and one-eighth inches.

While this is taking place, the spreader wings, being in down position, the fruit clamping members 616 and 618 are automatically released by a slide, which is located under the bearing for the wings. This mechanism is shown particularly in Figures 33, 36, 39, 40 and 41, wherein is disclosed the wedge 446 which is adapted to be projected between the two rollers 450 and 451, whereby to actuate reversal of the opposed slides 652 and 654. Each one of these slides is adapted to release a gripping finger, and the wedge is adapted to be reciprocated vertically downwardly between the rollers, there being one roller on each slide, and the two slides are arranged to be moved outwardly in opposite directions. The two rollers are interconnected with the slides in the manner shown in Figures 33 to 41, so that as the wedge descends the rollers are forced apart against the tension of the spring 656, and thus these two oppositely connected slides are brought toward each other. Each of the slides 652 and 654 are supported in the block 588, which is, in turn, supported by the lugs 390 formed on the sleeve 384 hereinbefore described. There is attached to the outer ends of each of these slides 652 and 654 brackets 658 and 660, which have formed on their outer ends lugs 668 and 670. These lugs 668 and 670 contact the projecting fingers 626 formed on the opposite end of the holding bar 616. When the wedge-shaped end of the vertical bar 446 is pressed downwardly to separate the rollers 450 and 451, they, in turn, being attached to the slide bars 652 and 654 will move the bars toward one and another, as shown in Figure 37, which will contact the projection on the rear portion of the finger 616, which will then rotate the finger 616 about the shaft 606 to release the half fruit from the spreader wings, and allow it to drop into the fruit cup, as shown in Figure 33. When the wedge-shaped bar 446 again raises, the two rollers 450 and 451 will move together and allow the spring 656 to return the slide bars 652 and 654 to their original starting position. It will thus be seen that these slides 658 and 660, by reason of their radial vertical extensions, the latter will contact the outer end of the fruit gripper and hold the fruit gripper open for a substantial arcuately upward movement of the wings until the wings are lifted sufficiently, so that they will not pick up the peach again after once depositing the peach in the cup. The wings thereafter continue to rise to vertical and juxtaposed position, and the cycle of movement of the wings is thereafter repeated. The wedge-shaped bar 446 is provided with a coil spring 672, which holds the weight of the wedge 446 off of the rollers when the wedge is not forced down by the cam 420.

The underside of the carriage is provided only on one side with the horizontally extending actuator or bracket 644 extending toward the main turret, which bracket moves with the carriage horizontally at one side of the track and at one side of the dividing plate. This actuator engages the oscillatable slide 632 (Figures 33 and 35) mounted on a part of the track 562 adjacent the center post of the main turret. This slide 632 has two spaced studs 642, which enter slots in the stationary track. One slot which is nearest the center post of the main turret, is horizontal, and the other slot is inclined, and the two studs which enter these respective slots. Now as the bracket 644 moves with the carriage 470 toward the main turret it contacts the roller 634 on the slide 632 and moves the slide to the right, as shown in Figure 29, whereby to cause the lugs 630 of the slide to contact arm 628 on the first finger and raise this finger to permit the half peach to be slid beneath the finger onto the spreader plate. The horizontally extending bracket 644 on the underside of the carriage 470 is disposed to override the roller 636 on the slide until just before the carriage 470 reaches its innermost position opposite the spreader wings. At this time the bracket 644 is cut away so that the roller is released and the fruit-holding clamp 616 drops down to hold the half peach on the spreader plate. This latter is a spring actuated movement so that the half peach is resiliently held on the spreader wing. This spring is on the pivotal post of the fruit finger 616 and is a torsion spring that normally throws the finger to down position. The two springs are oppositely wound on opposite sides of the machine.

A spring 568 (see Figure 8) interconnected with the slide 632 and the dividing blade slide 564 normally tends to pull the blade 546 toward the main turret against stop 570 and further so that, when the bracket 644 on the carriage drops off the roller on the slide after depressing the slide, this spring tends to again raise the slide for the next operation.

Peach pitting

In the present process and machine, the half peaches are pitted prior to being peeled. A distinct advantage is present in carrying out this sequence in the method of and machine for processing peaches, because in the subsequent peeling operation, hereinafter to be described, the peeling operation is more efficiently carried out by, first, removing the half pit from the half peach, whereby the peeling pad in conjunction with the action of the fruit cups is enabled to press the half fruit more firmly into contact with the inner curved walls of the fruit cups than would be the case if the rigid half pit were present. The details of construction of and the specific form of the pitter is not shown herein since the specific pitting mechanism used in the present machine is identical with the pitting construction shown in the prior application of Raymond L. Ewald and Henry A. Skog, Serial No. 185,332, filed January 18, 1938, entitled Fruit pitting apparatus, Patent No. 2,280,813, issued April 28, 1942, and its divisional application Serial No. 430,840, filed February 14, 1942, reference to which is made for a disclosure of the specific pitting apparatus. It is sufficient to state that in this particular form of pitter, two curved pitting blades are utilized which sever the section from the half fruit. However, it is within the contemplation of the invention to use other types of pitting mechanisms, provided they are adaptable to the present process and the present machine. No claim is made herein to the specific form of pitting mechanism per se, except insofar as a pitting device combines with one end or more of the other instrumentalities of the machine for accomplishing a definite sequence of operations upon the half fruit, and this is true either considered as a method or as an apparatus. In short, the arrangement of the pitting device or pitting step in the machine or in the sequence of operations ahead of the peeling step or peeling device, is a definite improvement in the art.

In Figure 2 of the drawings, the opposed pitting blades are shown associated with one of the cups, and, as heretofore stated, are preferably of the construction shown in the prior Ewald and Skog application aforesaid. These blades are arranged to cut around the under surface of the half pit during the pitting operation to an overlapping position, at which time, when the pitter head rises, the blades are lifted to carry the severed pit away from the pitted half peach, so that, when these blades are again opened, the pit will be kicked out or ejected away from the pitted half peach. The single cup in the meantime will have moved to the next station, which is the peeling station, leaving therein the pitted half peach with the pit removed therefrom.

The peeling mechanism

Referring to Figures 3, 5, 42 and 43, wherein means are shown for operating the pitting and peeling mechanisms, and also means for driving the two vertical shafts 36 and 50, as hereinbefore described, the shaft 36 is provided on its upper end with a loosely mounted collar 700. This collar has formed thereon a pair of extending arms 702 and 704. By means of a pin and slot connection 706, the arm 702 is affixed to the flexible connection 708, which, in turn, is connected to a bar 710, which has at its opposite end a smaller flexible connection 712 with a slotted arm 714 (see Figure 14). This arm 714 is pivotally supported as at 716 on a vertical reciprocating frame or head 718 that supports the pitting and peeling mechanism. Frame 718 is reciprocated vertically by means of the cam 24, hereinbefore described. A vertical slide 720 is provided with a roller 722 which engages a cam track 24a formed on the outer surface of disk 24. The rotation of the shaft 14 rotates the disk 24, which, in turn, has a cam track 24a thereon, which will raise and lower the vertical slide 720 by means of the roller 722, thereby causing the frame or head 718 to raise and lower in synchronous movement with the rotating half-fruit turret. As seen in Figure 5, the vertical slide 720 is connected to the frame 718 by means of an adjustable set screw 726. The frame 718 has vertical guideways 728 which are bolted to the main frame columns 2 and 4 of the machine. Upon the upper portion of the frame 718, there is provided a platform or ledge 730 to accommodate the pitting mechanism 732 and the peeling mechanism 734, the pitting mechanism being attached to the frame 718 by means of bolts 736 and the peeling mechanism being attached to the frame by means of bolts 738.

As shown in Figure 42, the driving means for the pitting device are actuated by the hereinbefore described slotted arm 714, which, in turn, is keyed to a short shaft 740. Shaft 740 has keyed on its opposite end a segment gear 742, which actuates a vertical rack bar 744, which operates the pitting mechanism.

Means for actuating the arms 704 and 702 consists of a link connection 744 connected to the outer end of the arm 704, and its opposite end is connected to a crank arm 746 by means of the pin connection 748. The crank arm 746 is keyed to the vertical shaft 50, which is actuated by the connecting links 44 and 46, et cetera, hereinbefore described. Upon actuation of the vertical shaft 50, the crank 746 imparts motion to the bar 744 to oscillate the arms 704 and 702 to actuate the drive for the pitting mechanism. Situated on the shaft 36 and directly below the collar 700 is a similar collar 750 having a crank 752, which has a flexible connection with an adjustable bar 754, and which has on its opposite end a pivoted connection 756 with a collar 758. This collar is part of an arm 760 shown in Figure 10. The arm 760 bends downwardly and is formed integral with a collar 762, which is, in turn, keyed to the shaft 764 by a pin 766. The collar 762 has also formed thereon a gear sector 768, which rotates a pinion 770, keyed on a short shaft 772. The shaft 764 which is pinned to the collar 762 has pinned on its opposite end another collar 774, which has formed thereon a gear sector 776 similar to the gear sector 768. The gear sector 776 rotates the pinion 778 in the same direction and at the same speed as the pinion 770 on the opposite side of the peeling mechanism. The shaft 764 is mounted on bearings 780 which are formed on a peeling head 782. This peeling head, likewise, at its bottom carries opposed, spaced-apart bearings 784 and 786 for the shafts 772 and 777. Each of these shafts at its inner ends is provided with a block 788 and 790, to which the opposite ends of the peeling knife 792 are affixed by means of triangular blocks 794 and 796. The peeling knife 792 is constructed in accordance with prior patents of Mark Ewald, such as Patents Nos. 2,015,666 and 1,987,611.

The peeling head 782 is provided with an upstanding bracket 798 bolted thereto as at 800, which bracket at its upper ends is provided with a laterally extending arm 802 and a guideway 804 (see Figure 47) adapted slidingly to receive an arm 806 to prevent pad 818 from turning. In addition, the head is provided with a centrally apertured boss 808 adapted to receive a vertical sleeve 810 having a central enlarged opening 812, which joins with a smaller center bore 814 of the sleeve 810. The bottommost portion of this sleeve is provided with a rigid foot or pad 816, the details of which are shown in perspective in Figure 49. This pad 816 is provided with a portion 818 of larger diameter and a portion 820 of smaller diameter, there being two shoulders 822 and 824 therebetween. The top of the sleeve 810 extends outwardly through the opening in the arm 806, and a spring 826 is confined between the arm 806 and a cylindrical block 828 at its top abuts a screw 830 thereat through the lateral arm 802 of the bracket 798 on the vertically shiftable peeling head. A lock nut 832 holds the nut in adjusted position to regulate tension of the spring 826, which spring, in turn, is adapted to maintain the peeling pad 818 resiliently in downwardly projecting position relative to the peeling head 782. In addition, there is provided a knock-out pad comprising a preferably circular smaller pad 834 mounted on the lower end of a rod 836 having a spring abutment member 838 pinned thereto. The upper end of this rod passes through a bore 814 of the upper end of the sleeve 810, and is provided with a cross pin 840 acting as a stop.

In addition, a spring 842 is seated within the large bore 812 (see Figure 45) of the sleeve 810 surrounding this stem, and is confined therein between the inner wall of the upper surface of the bore and the stop collar 838, by which means the spring 842, which is weaker than the spring 826, normally maintains the knock-out pad in a position lower than the surface of the pad member 818, whereby, as the peeling head descends, the knockout pad will first contact the pit zone of the peach, and, if the pit be present, the pad will be pushed upwardly by such contact until it seats in a countersunk recess 844 in the bottom face of the circular pad 818. Thereafter, if the half peach in the cup be too large in size, the main pad 818, together with the knock-out pad, will be forced upwardly against the tension of the stronger spring 826, whereby adjustably to accommodate this larger sized half fruit. At the same time the pad pressing downwardly on the central portion of the half fruit will maintain the half fruit from turning. The knockout pad prevents the main pad from sticking to the face of the half peach.

Cooperating with this resiliently shiftable pad 818 is a pad 846, which is shown in Figure 49, is, likewise, semi-circular in shape. It has a centrally disposed semi-circular cut-out 848 which corresponds to and matches the semi-circular portion 820 of the pad 816 so as to nest therewith. In addition, this pad has two upstanding posts 850 and 852, which are joined by circular extension 854 having an upstanding lug suitably apertured as at 856, whereby this pad is bolted as at 860 to a depending bracket portion 862 of the peeling head 782. A slotted portion of the bracket 862 permits adjustment of this stationary pad portion relative to the peeling head 782. It will thus be seen that this pad portion 846 is rigidly carried by and reciprocates with the main peeling head 782, which carries the oscillatable peeling knife 792, so that, when the peeling head descends to bring the knife into proper position relative to the cut face of the half fruit, as shown in Figures 45 and 46, this pad 846 will be brought downwardly into contact with that portion of the cut face of the half fruit, from which the knife blade 792 emerges during the peeling stroke or cut, whereby two functions are accomplished—first, the half fruit will be held from upward tilting movement at this point, due to the inward and downward arcuate thrust of the cutting knife as it enters the half fruit; and, secondly, the outer circular edge of the pad 846 is arranged so that it contacts the cut face of the half fruit approximately at the peel zone of the half fruit, whereby this circular edge of the pad 846 cooperates with the cutting edge of the peeling knife to form, with the peeling knife, a cooperative shearing edge. Thus this stationary edge of the pad 846 provides means for preventing the edge of the half fruit at the cut face from breaking off as the peeling knife emerges from the cut face of the half fruit upon the completion of the peeling cut in this direction.

By thus providing this stationary peeling pad 846 in combination with a resiliently shiftable peeling pad 816, and by arranging the stationary pad 846 at the knife emerging face of the cut fruit while providing the resiliently mounted peeling pad 816 at the entrance face of the half fruit with respect to the peeling knife, the necessity of positively locking the peeling pad in downwardly position on the cut face of the half fruit for a whole or even a part of the peeling cut, is eliminated; while at the same time during the initial portion of the downward movement of the peeling cut through the half fruit, the peeling pad 816 which is provided with adjustable resilient action in upward and downward direction, holds the half fruit firmly against the inner wall of the peeling cup. In this pad arrangement, the pad 816 is maintained a standard size for all sizes of fruit, whereas the pad 850 is replaceable with pads of smaller or larger sizes, so that the arcuate edge 846 of this pad will always lie relatively close to the path of movement of the peeling knife, depending upon the size of the half fruit being operated upon, whereby this edge of the stationary pad acts as a sort of shearing knife to cooperate with the edge of the peeling blade.

The half fruit receiving cups are constructed in the same manner as in the prior application of Raymond L. Ewald and Henry A. Skog, Serial No. 185,332, filed January 15, 1938. However, the means for moving the enlarged half section into eccentric relation to the stationary half section has been changed somewhat, and is shown as in Figure 8.

In this connection it will be noted that the turret 380 has mounted thereon six half peach receiving cups, which are of the general conformation shown in Figures 45 and 46. One of the quarter sections 880 of each of these cups is rigidly bolted by means of a bolt 381 to the spider of the turret 382. The other cup section 878 is hingedly mounted to the stationary section as by means of the pin 879, whereby these two complemental quarter cup sections will make a substantial half sectional cup. These relatively swingable cup sections have a so-called closed position, wherein the two sections are eccentric one to the other, which is shown in Figure 48; and this eccentric position is accomplished by moving the swingable fruit holder toward the stationary fruit holder, whereby to press the curved wall 882 of the half fruit against the inner wall of the adjacent stationary section 880, so that on the down stroke of the cutting blade 792, the firm contact of the periphery of the half fruit against the wall of the cup section 880 is assured, and whereby correct peeling is likewise assured; and, subsequently, in timed relation with the arcuate movement of the peeling knife 792 and about the time that is necessary to reach the bottommost part of its stroke, the actuating mechanism for the shiftable half cup is released, so that the shiftable half cup 878 is free to swing to an open position, preferably by the action of gravity. In this position the cup sections 880 and 878 will be truly concentric. At this time, movement of the peeling knife 792, as described in pending Ewald application, Serial No. 201,413, filed April 11, 1938, will push over the half fruit against the inner adjacent wall of the swingable cup section 878 now in its truly concentric position and simultaneously, as the knife continues to move, it will start its upward, arcuate cut slightly under the peel, whereby continuously to form the peeling cut. This whole portion of the cut will be the emerging peeling cut. The mechanism for carrying out this operation, as shown more clearly in Figures 44 and 45, consists of a cam 884 which is keyed to the shaft 14 and a cam roller 886 which is fixed to a vertical slide bar 888, and engages the cam 886, as shown. The slide bar 888 is guided in a guideway 890, which is bolted to the frame 4 as at 892 and 893, and this bar 890 has pivoted on its upper end as at 894 a cam finger 896 which is held in the position shown in Figure 44 by a spring 898 and a stop screw 900. Upon raising the bar 888, the cam finger 896 contacts a roller 902 on a depending arm 904 pivoted on the shaft 879 and having its upper portion formed integral with the righthand movable section of the fruit cup 878.

Due to the tension of the spring 898, the cam finger 896 exerts a pressure on the roller 902, which, in turn, moves the righthand portion 878 of the fruit cup toward the lefthand portion 880, thereby clamping or exerting a pressure on the side of the fruit to hold it substantially rigid in the fruit cup while the peeling is taking place.

In addition, an adjustable stop screw 906 contacts an extension 908 formed on the support arm 904, and prevents the cup section 876 from being swung out of concentric alinement with the lefthand cup section 880. This type of construction for shifting the swingable cup section 878 toward the stationary cup section 880 is more positive, is also independent of the movement of the peeling knife and permits the closing of the cup section 878 before the peeling pad comes in contact with the face of the fruit, which is not possible in the prior construction because the cup thereof does not start to move until the peeling knife starts to turn. A more positive action is required in the peach machine due to the nature of the peel surface of the half peach, as distinguished from the more smooth surface of a pear. Therefore, a stronger closing action of the cup 878 is required, and this is accomplished by the mechanism shown in Figure 44.

The processed fruit discharging station

Upon completion of the peeling operation, the peeling head moves up in synchronous relation with the lateral movement of the cup carrying the half fruit already peeled and pitted, with the half fruit overlying the loose peeling. With the intermittent counterclockwise movement of the cup carrying turret 382, the carrying the pitted and peeled fruit, is next brought under the half fruit ejector 912, as shown in Figures 2 and 50. As the half fruit cup comes directly below the ejector 912 (see Figure 50), it is momentarily halted in its intermittent movement, thereby allowing time for the fruit ejector to remove the half fruit from the fruit cup. To accomplish this ejection, a frame member 914 has on its outer end a bearing 916, and on its other end a flange 917 to support a bearing 918, which bearing, in combination with the bearing 916, supports opposite ends of a shaft 920. Attached to the underside of the shaft 920 is a flat circular disk 922, and, which is positioned directly over the central portion of the half fruit cup. The shaft 920 is provided with a cutaway portion on its underside to provide a surface, whereby the disk 922 may be attached by tapered head screws 924. On the outer end of the shaft 920 there is pinned a gear 926, which engages another gear 928 keyed on a sleeve 930 which is rotatably supported on a stud shaft 931, which has threaded engagement in a downwardly extending portion 932 of the main bearing 918. Also, keyed to this sleeve 930 is a bevel gear 934 engaging a larger bevel gear 936, which is, in turn, pinned to the hereinbefore mentioned shaft 66.

Attached to the main upright vertical frame members 4 and 8 is a cross frame member 941 and supporting bearings 938 and 940 supporting the shaft 66, which, in turn, supports the fruit ejecting frame 912. The bevel gear 64 hereinbefore described is also pinned to the shaft 66 at 942. In addition, the frame 912 is provided with bearings 916 and 918, and also has an extension 944 which terminates in the bearing 946 on the shaft 66. This bearing portion 946 has formed on its lefthand end a sleeve portion 948, which is surrounded by a friction collar 950 pressed about the sleeve 948. Yieldably clamped about the friction collar 950 by a spring 953 are hinged friction band sections 951 and 952. These bands are tightened by the adjusting screw 954 which is threadedly connected to one section 952 of the hinged friction band at 955 and projects through the other portion of the friction band 951 as at 957. A hinge pin 959 connects the two friction band sections 951 and 952 together. Secured to the shaft 66 by a set screw 961 is the driving collar 963 which has a connecting lug 965 formed thereon and located between two spaced shoulders on the segment 952 of the friction band. This lug 965 thus drives the friction bands. In addition there is formed on the bearing 946, a lug 971 which contacts an adjustable set screw 958 mounted on a fixed support.

A continued rotation of the shaft 66 causes the bevel gear 936 keyed to the shaft 66 to turn the bevel pinion 934, which now rotates the gears 928 and the shaft 920 clockwise through 180 degrees to wipe the half fruit out of the cup. This assembly has been lowered at this time until the shoulder on the shiftable bearing 946 contacts the stop lug 962 on the stationary frame. Under reverse turning of the shaft 66, the friction set up by the friction clamps 950 and 951 causes the assembly to tip up as shown in dotted lines in Figure 51 until the lug 971 contacts the stop screw 958 on the bracket 967 which is formed on the stationary portion of the frame. Continued rotation of the shaft 920 will turn the ejector pad 922 in position for lowering properly on the next section of half fruit. In addition, a fruit ejector chute 964 is positioned adjacent the shaft ejector frame assembly 912, and is provided with an arcuate ledge 966, which is attached to the forward edge of the chute as at 968, and is provided with a rubber segment 973 which overlies the edge of the fruit cup, just sufficient so that the peeling will be held in the cup while the fruit is being ejected. When the half fruit is wiped out of the cup, it contacts the slanted surface of the fruit ejector chute, which is inclined, as shown in Figures 1 and 50, and which tips up and down with the whole ejector assembly. The chute 964 has a lateral extension provided with the collar 965 surrounding the circular portion of the bearing 940, shown in Figures 1 and 50, and the chute, as shown in Figure 50, overlies the oscillatable frame extension 944 so that when this frame extension is oscillated to raise the frame 914 and the shaft 920 away from the cup, the extension 944 will be raised therewith. In this raised position the turret may move to bring another cup into registration with the path of movement of the pad 922 on the shaft 920. Thus when the shaft 920 and its frame 912 are lowered the pad 922 will be brought into registration with the open mouth of the new cup. The chute 964 will drop of its own weight to place the rubber flap 973 into proper registration with the edge of the wall at the mouth of the cup. The half fruit slides down the chute into the receptacle placed directly below the ejecting end of the chute 964.

An upstanding flange or wall 970 formed at right angles to the bottom section of the chute 964 forms a part of the chute and helps in discharging the fruit down the chute.

The peel scavenging means

After processing, the half peach is discharged from the machine by means of the fruit discharger or extractor leaving the peel in the cup. The cup then moves with an intermittent movement to the peel scavenging station whereat means is provided for discharging the peel from the cup in such a manner as to permit the turret subsequently to convey the scavenged cup to the next station in a closed cycle. As hereinbefore described, the pinion 58, which is rotated by means of the vertical rack bar 54, rotates the shaft 60, which, in turn, operates the scavenging mechanism 972. This scavenging mechanism is constructed along the same lines as the scavenging mechanism disclosed in the application of Raymond L. Ewald and Henry A. Skog, Serial No. 185,332, filed January 15, 1938, with one exception—the scavenging blade 974, shown in Figure 54, is provided with a set of wire projections 976 and 978. These projections are fastened to the panel 974 by means of screws 980, the wires 976 being coiled about the screws before they are threaded into the threaded portion of the paddle operating shaft 982. The purpose of these spring fingers 976 and 978 is to provide a more effective and cheaper means for holding the peeling on the blade 974 during the inversion of the paddle, and also helping to provide a more positive means of removing the peeling from the fruit cup.

Having thus described our invention, what we claim as new and desire to secure by Letters Patent is:

1. In a fruit-treating machine, a pair of turrets each operative to carry the fruit to successive fruit-treating stations, whole fruit-holding means carried by the first turret, bisecting means operable at one station to which the whole fruit is carried by the first turret for bisecting the fruit, transfer mechanism operable at a subsequent station to which the fruit is carried by the first turret for transferring fruit halves from the first to the second turret, said transfer mechanism including half-fruit holders and a dividing plate between said holders for maintaining the fruit halves slightly spaced apart, and means for operating said transfer mechanism to carry said dividing plate between the fruit halves at said subsequent station of the first turret and for causing said holders to grasp the fruit halves while separated by the dividing plate.

2. In combination with a support, fruit-holding means thereon adapted to hold two half peaches with their cut faces in confronting, contiguous relation, a pair of spreader plates spaced from said holding means and adapted to be positioned with their rear faces contiguous and in parallel planes, a non-rotary divider plate shiftable between the fruit-holding means and the spreader plates and adapted in one position to enter between the confronting faces of the held half peaches, and in another position to lie contiguous to the spreader plate, peach transfer means adapted to grasp the severed half peaches when held in the holding means and to convey them with the dividing plate therebetween toward the spreader plate, and means for maintaining the divider plate stationary while continuing the movement of the transfer means for conveying the severed fruit halves from the divider plate onto the spreader plates.

3. In combination with a support, fruit-holding means thereon adapted to hold two half peaches with their cut faces in confronting, contiguous relation, a pair of spreader plates spaced from said jaws and adapted to be positioned with their rear faces contiguous and in parallel planes, a divider plate shiftable between the fruit-holding means and the spreader plates and adapted in one position to enter between the confronting faces of the held half peaches and in another position to lie contiguous to the spreader plate, and peach transfer means adapted to grasp the severed half peaches when held in the holding means and to convey them with the dividing plate therebetween toward the spreader plate.

4. In a fruit feeding machine, a gripping unit, a saw normally positioned out of the path of travel of said unit for splitting a whole fruit carried by said unit, means for moving said gripping unit to dispose the fruit in operating relation with the saw, means for thereafter feeding the saw through the fruit, said moving means carrying said gripping unit to a succeeding station, a dividing plate normally positioned out of the path of travel of said unit, and means for moving said dividing plate to insert it between the fruit halves at said succeeding station to maintain the fruit halves in the same relative position as prior to bisecting.

5. The combination with means for holding severed halves of a whole fruit with their cut faces contiguous and in confronting relation, a pair of spreader plates adapted to shift from closed position with their inner faces contiguous and parallel to a position with their faces at right angles thereto, said spreader plates being spaced from said holding means, transfer jaws adapted to grasp the severed halves of peach and move them from the holding means onto the spreader plates, a dividing plate shiftable by the transfer jaws from a position contiguous the front edge of the spreader plates to a position between the peach halves while held in the holding means, and resilient means for oppositely shifting the divider plate with the transfer jaws from said position between the peach halves while held in the holding means to a position contiguous to the spreader plates, stop means for arresting the dividing plate at such last mentioned position while permitting the continued movement of the transfer jaws to carry the fruit halves independently of any further movement of the dividing plate onto the spreader plates, and means for actuating said spreader plates in timed relation with the movement of the dividing plate and the transfer jaws.

6. In combination with a support, fruit-holding means thereon adapted to hold two half peaches with their cut faces in confronting, contiguous relation, a pair of spreader plates spaced from said holding means and adapted to be positioned with their rear faces contiguous and in parallel planes, a divider plate shiftable between the fruit-holding means and the spreader plates and adapted in one position to enter between the confronting faces of the held half peaches, and in another position to lie contiguous to the spreader plates and in a common plane with the spreader plates, peach transfer means adapted to grasp the severed half peaches when held in the holding means and to convey them with the dividing plate therebetween toward the spreader plates, and means for stopping said divider plate when it becomes contiguous to said spreader plates while continuing movement of said transfer means to carry the fruit halves onto the spreader plates from the divider plate.

7. In a device of the class described, the combination with a stationary support, an intermittently operable turret therein, a plurality of pairs of fruit receiving jaws mounted on said turret in radially spaced relation thereabout whereby said jaws are adapted to move successively in a predetermined path, each of said pair of jaws being relatively shiftable toward and from each other in a direction transversely of said path whereby to grasp therebetween or release therefrom a whole peach, whole-fruit positioning means shiftably associated with said support comprising a concaved receiver having a projection thereon adapted to enter the stem cavity of the whole peach whereby to position the whole peach substantially precisely in said receiving means, mechanism for shifting said receiver from a position removed from the path of action of each pair of jaws into position to place a whole peach between a pair of jaws when open, said receiving means, when in stationary peach receiving position, being angularly shiftable toward said jaws in a manner to position the whole peach in said jaws with the stem axis of the peach inclined angularly with respect to a plane passing transversely to the axis of turning of the turret.

8. In a device of the class described in combination with a stationary support, a turret intermittently rotatable thereon, a pair of jaws carried by said turret and moveable therewith, means acting in timed relation with the movement of the turret for opening said jaws and for closing said jaws, said jaws including means operable to move each jaw simultaneously and at equal distances during the opening and closing movements, a carrier pivotally mounted with respect to said stationary support, a whole-fruit receiver resiliently mounted on said carrier, said concaved carrier having a positioning element thereon adapted to enter the stem cavity of the half peach, and means for arcuately swinging said carrier toward and from said jaws while said turret is stationary, said carrier being constructed and arranged to insert the whole peach within the jaws with the stem cavity outermost and with the stem axis of the whole peach inclined at an acute angle with respect to a horizontal plane passing transversely through the central axis of the turret.

9. In a device of the class described, the combination with a stationary support, a turret adapted intermittently to rotate about a central axis of said support, said turret including a plurality of radially spaced fruit holders each including a pair of jaws pivotally mounted about horizontal axes adapted to shift toward and away from each other simultaneously in equal amounts, means for opening and closing said jaws, a lever mounted on said stationary support below the path of travel of said jaws, said lever having means for raising and lowering the same and including on the outer end of the lever a slideway, a receiver shiftably mounted in said slideway for movement at an angle to the longitudinal axis of the lever, spring means for normally forcing said receiver outwardly, said receiver including a concaved cradle-like seat adapted to receive a whole peach, and likewise including a stem cavity positioning member thereon adapted to enter the stem cavity of the whole peach to position the stem axis of the fruit in said carrier, and means for oscillating said lever to shift the whole peach from a position wherein the stem axis of the whole peach is shifted toward a horizontal plane and for positioning said whole peach in the jaws of the holder with said stem axis lying substantially 30 degrees below or downwardly inclined from said horizontal plane, and means while in such position for causing said jaws firmly to grip the curved surfaces of the whole peach and hold the same in such position, and means for thereafter shifting said receiver away from said jaws and for moving said turret to carry the whole peach thus held to another station.

10. In a device of the class described, in combination with a stationary support, a turret rotatably mounted thereon for movement in a predetermined plane, whole-fruit holding means pivotally mounted on said turret for movement toward and from each other in planes transverse to the plane of rotation of said holding means on said turret, comprising a lower jaw pivotally mounted on said turret and having a forward portion provided with spaced ends substantially arcuately curved to contact the rounded surface of a whole peach on opposite sides of the suture plane of the whole peach, a second jaw member pivotally mounted on said turret and spaced from said first jaw member and including a first extension provided with a substantially arcuately curved fruit gripping member, and a second extension having a substantially arcuately curved fruit gripping member mounted adjacent said first mentioned arcuately curved fruit gripping member of the second jaw and spaced laterally therefrom, means providing a relatively adjustable movement between said two arcuately curved fruit gripping members of the second jaw, said last mentioned two gripping members being adapted firmly to hold the curved surfaces of the fruit on opposite sides of the suture plane irrespective of variations in fruit diameter on opposite sides of the suture plane of the whole peach.

11. In a device of the class described, the combination of a stationary support, a rotatable turret thereon rotatable in a horizontal plane, a first fruit jar pivotally mounted thereon to shift vertically and having spaced portions adapted to contact the curved periphery of a whole peach on opposite sides of the suture plane, said turret having pivotally mounted thereon, a second jaw movable vertically and relatively to said first jaw to receive and grip a peach therebetween and thereafter to open to permit the discharge of said peach, said second jaw also having spaced portions disposed to lie on the opposite sides of the suture plane and at a point substantially diametrically opposite the spaced portions of said first mentioned jaw, and means providing relative adjustable movement between the spaced portions of one of said jaws, whereby to accommodate unevennesses in the portions of the whole peach on opposite sides of the suture plane of the whole peach.

12. In a device of the class described, in combination with a stationary support, a shiftable carrier thereon having an upright portion, a first jaw pivotally mounted on said carrier for vertical swinging movement, the outer portion of said first jaw having spaced arcuate grippers adapted to grip the curved periphery of the whole fruit on opposite sides of the suture plane thereof, said first jaw having a laterally extending toothed sector, a second jaw member pivotally mounted on said support and having a toothed sector engaging the teeth of the first mentioned sector, said second jaw having a hub portion and having a portion adapted to contact the curved surface of a half fruit on one side of the suture plane substantially diametrically opposite that portion of the periphery of the whole fruit contacted by a gripper of said first mentioned jaw, and a cooperative jaw member angularly mounted in the hub of the second mentioned jaw member and shiftable vertically with respect thereto a limited amount, said cooperative jaw member having a fruit contacting portion adapted to lie spaced from its coopertaive jaw portion and on opposite sides of the suture plane and diametrically opposite a gripper of the first mentioned jaw.

13. A whole-fruit holding member for automatic feeding machines comprising a support, a first jaw pivotally mounted thereon including spaced-apart contacting members adapted to engage the curved surface of a whole fruit on opposite sides of the suture plane, a second jaw pivotally mounted on said support and having means to engage the first jaw to compel the two jaws to move simultaneously equal distances, said second jaw having an apertured hub and a laterally projecting lug, a third jaw having a bearing turnable in said apertured hub and a furcation adapted to engage opposite sides of said lug, said third jaw having portions adapted to lie on opposite sides of the suture plane of the whole fruit, means for actuating said jaws to cause the same to grip a whole fruit at four spaced-apart points on opposite sides of the suture plane of the whole suit, and means for releasing the whole fruit from said jaw.

14. In a device of the class described, a whole-fruit holder comprising four spaced-apart jaws adapted to grip a whole fruit at spaced points on opposite sides of the suture plane of the whole fruit and substantially at points diametrically disposed on the curved surfaces of the whole fruit, two of the jaws on the same side of the suture plane of the whole fruit being capable of greater or lesser movement than the relative movement of the pair of jaws on the opposite side of the suture plane, whereby to compensate for variations in the dimensions of the fruit on opposite sides of the suture plane, and means for simultaneously operating all of said jaws toward and from each other.

15. In a fruit treating machine, the combination of a stationary support, an intermittently operable turret mounted thereon having a plurality of radially disposed, spaced whole-fruit holding jaws each adapted to hold a whole fruit therein with the suture plane disposed parallel to and substantially in a plane disposed radially of and parallel to the axis of turning of said turret in predetermined position, means for intermittently shifting said turret to move a whole fruit so held in said holding means on the turret to a sawing station, rotatable sawing means disposed at said station and in a plane passing through the axis of turning of said turret and parallel to said axis, means for shifting said rotating saw along said last mentioned plane from a position away from said held whole fruit toward and into contact with the flesh of the whole fruit, whereby to sever the whole fruit and its seed section, and means for thereafter withdrawing said saw from proximity of the severed halves of said fruit, and means for thereafter shifting said turret to transport the severed halves from the sawing station.

16. In a device of the class described, in combination with a support, a main turret mounted thereon carrying a plurality of half peach cups, a second turret thereon in spaced relation therefrom, said second turret comprising pairs of radially disposed whole-fruit jaws, transfer means moving back and forth between said turrets, means for operating said turrets and said transfer jaws in synchronism, means for feeding a succession of whole peaches into the holding jaws of said second turret and for moving said second turret angularly to a sawing station, a shiftable support mounted at said sawing station, a rotatable saw shiftably mounted thereon and adapted to move from a point out of the path of movement of said second mentioned turret to a position within the path of movement of said turret, whereby to cause the cutting edge of said rotating saw to pass through the flesh and the pit at the suture plane of a whole fruit, means for thereafter moving said saw from the path of movement of said second turret and for shifting said second turret with the sawed halves of the fruit therein to the transfer station, means for shifting said fruit transfer means to abduct the severed halves of the fruit and convey them to the first mentioned turret, and means thereat for depositing said severed halves in adjacent cups of said first mentioned turret.

17. In a device of the class described, the combination with a stationary support, a turret intermittently rotatable thereon and carrying radially disposed sets of jaws, means for relatively moving said jaws to receive a whole peach therebetween, each set of jaws having adjacently associated therewith a centrally disposed backing member adapted to engage the curved surface of the whole peach held between said jaws, each of said jaws and said backing member being kerfed in a common plane, means for shifting said turret and set of jaws to a sawing station, a saw mounted on said support, means for rotating said saw, means for shifting said saw and support to carry the blade of said rotating saw into the kerf of said jaws and said backing member, whereby completely to cut through the flesh and pit of the peach, and means for thereafter moving said rotating saw from said jaws and from said backing member and severed peach, and for thereafter turning said turret to remove the severed halves from said sawing station.

18. In a device of the class described, in combination with fruit holding means adapted to hold two halves of a severed whole peach with the cut faces in contacting confronting relation, a pair of spreader plates disposed remotely therefrom and with their walls in vertical, parallel juxtaposition, transfer mechanism adapted to grasp the two severed halves thus held and transport them onto the opposed outer faces of the spreader plates, means between said whole-fruit holding means and said spreader plates adapted to pass between the two severed halves while held in the holding means, and means for moving said last named means while in position between said severed halves and with the halves toward the spreader plates whereby to facilitate the placing of each half upon its spreader plate.

19. In a device of the class described, in combination with means for holding in contacting, confronting relation the cut faces of the two halves of a severed whole fruit, spreader means providing juxtaposed faces upon each one of which one of the half fruits is adapted to be positioned, means for transporting the two halves from said holding means onto said spreader plates, and means movable with said transporting means from said first mentioned holding means to said spreader plates, said last named means having a portion adapted to pass between the severed halves of fruit.

20. In a device of the class described, in combination with a turret, a plurality of spaced-apart fruit holders thereon each adapted to hold severed halves of the whole fruit with their cut faces in confronting, contacting relation, a guideway in registry with each successive fruit holder of said turret, transfer jaws reciprocably mounted on said guideway including mechanism for actuating the jaws for grasping the confronting halves held in the fruit holding devices and for transporting the same along said guideway, spreader mechanism disposed in the path of travel of the transfer jaws and adapted to receive and spread the fruit halves, and means operable along said guideway between the fruit holders and the spreader means, said means including opposed flat faces each adapted to receive one of the half fruits thereon.

21. In a device of the class described, in combination with means for holding two severed halves of a whole fruit with their cut faces in confronting, contacting position, and fruit spreading means disposed in spaced relation from said fruit holding means, transfer means for abducting the two halves of fruit from the fruit holding means and for placing the same upon the spreading means, and shiftable means disposed between the fruit holding means and the spreader means and adapted to receive the half fruits thereon for assisting in conveying said half fruits from the whole-fruit holding means to the spreader means.

22. In a device of the class described, in combination with means for holding two severed halves of a whole fruit with their cut faces in confronting, engaging relation, spreader means disposed remotely therefrom, fruit transfer mechanism shiftable in a straight line between the fruit holding means and the fruit receiving means, and means adapted to separate the fruit halves during their transfer from the fruit holding means to the spreading means.

23. In a device of the class described, in combination with means for holding two severed halves of a whole fruit with their cut faces in confronting and contacting position, fruit dividing means adapted to enter between the halves of fruit and movable reciprocably between the fruit holding means and the spreader means, transfer means for abducting the two halves of fruit from their holding means and for placing the same upon the spreading means, said transfer mechanism being movable with the last mentioned means and being movable independently thereof.

24. In a device of the class described, in combination with a fruit holder adapted to hold severed halves of a whole fruit with their cut faces in confronting, engaging relation, fruit spreader means disposed remotely therefrom, fruit transfer means operable between the fruit holding means and the spreader means, and a divider plate movable between the fruit holding means and the spreader means, said divider plate being actuated in one direction by the fruit transfer means and being resiliently actuated toward the spreader plate in the opposite direction.

25. In a device of the class described, in combination with holding means adapted to hold severed halves of a whole fruit with their cut faces in confronting, engaging relation, spreader means, track means disposed between the fruit holding means and the spreader means, a fruit transfer carriage movable along said track means, fruit transfer jaws carried thereby, means for operating the carriage and the jaws for grasping the fruit halves in the holding means and conveying them in straight-line motion onto the spreader means, a divider plate carriage mounted to move along said track means, means operated by the transfer jaws for actuating said divider plate in the direction toward the fruit holding means, and spring means for shifting the divider plate with the transfer jaws in a direction toward the spreader means.

26. In a device of the class described, in combination with a pair of spreader plates adapted to be positioned with their rear faces in vertically confronting contiguous relation, fruit holding means for holding the severed halves of a whole fruit with their cut faces in confronting, engaging relation, and parallel to the planes of said spreader plates when in contiguous relation, transfer means for shifting said fruit halves from said holding means onto said spreader plates, means automatically operated by and in timed relation with the movement of the transfer means in transferring each half fruit onto the outer surfaces of a spreader plate for clampingly engaging a portion of each half fruit to hold the same in position on each of said vertically disposed spreader plates, and means for shifting the spreader plates with the half fruit clamped thereon.

27. In a device of the class described, in combination with fruit holding means adapted to hold half peaches with their cut faces in confronting, engageable relationship, spreading means comprising a pair of plates disposed remotely from said fruit holding means, said spreader plates being so positioned that their adjacent faces are in confronting relation, fruit transfer means disposed to be actuated between the fruit holding means and the spreader means, and including means adapted to grasp the two fruit halves and shift the same onto the outer surfaces of the spreader plates, and shiftable fruit clamping means on the spreader plates and positively operated by the movement of the fruit transfer means for clampingly engaging each half fruit placed on a spreader plate, and means for pivotally shifting each spreader plate with the half fruit carried thereon.

28. In a device of the class described, in combination with fruit holding means adapted to hold peach halves with their cut faces in engaging, confronting relation, a pair of spreader plates disposed in spaced relation therefrom, said plates being shiftable from a vertical position wherein their rear faces are in juxtaposed position to substantially horizontal position, fruit transfer means for abducting the fruit halves from the holding means for carrying them onto the outer faces of the vertical spreader plates, clamping means shiftably mounted on each of the plates, means actuated by the transfer means engaging the clamping means to shift said clamping means to permit the placing of each half fruit thereon and means thereafter operative clampingly to engage the half fruit and hold the same on the spreader plate during the movement of the spreader plate substantially to horizontal position.

29. In a device of the class described, in combination with a fruit holding means adapted to hold peach halves with their cut faces in engaging, confronting relation, a pair of spreader plates disposed in spaced relation therefrom, said plates being shiftable from a vertical position wherein their rear faces are in juxtaposed position to a position wherein outer faces of the spreader plates are in substantially horizontal position, fruit transfer means for abducting the fruit halves from the holding means for carrying them onto the outer faces of the vertical spreader plates, each of the plates having clamping means thereon, and means for positively shifting the clamping means to open position to permit the placing of each half fruit on said plate, and spring means operatively associated with said fruit retaining means to close said means on said fruit to hold the half fruit on the spreader plate during the movement of the spreader plate substantially to horizontal position.

30. In a device of the class described, in combination with a fruit holding means adapted to hold peach halves with their cut faces in engaging, confronting relation, a pair of spreader plates disposed in spaced relation therefrom, said plates being shiftable from a vertical position wherein their rear faces are in juxtaposed position to a position wherein outer faces of the spreader plates are in substantially horizontal position, fruit transfer means for abducting the fruit halves from the holding means for carrying them onto the outer faces of the vertical spreader plates, clamping means associated with each plate, means for shifting the clamping means to open position to permit the placing of a half fruit on said plate, and operatively associated means for shifting said clamping means to closed position.

31. In a device of the class described, in combination with a fruit holder for holding severed halves of a whole fruit with their cut faces in engaging, confronting relation, a pair of spreader plates adapted to be shifted from juxtaposed, vertical position to open horizontal position, a trackway disposed between said fruit holder and said spreader plates, transfer means shiftable to carry the fruit halves from the holding means across and onto the opposed surfaces of the spreader plates, each of said spreader plates having shiftable clamping means thereon, shiftable means mounted on said track and adapted to be engaged by said transfer jaws for actuating the fruit clamping means to clamp the fruit on each spreader plate prior to the shifting of each spreader plate to horizontal position.

32. In a device of the class described, in combination with a first turret, means for intermittently moving the same, fruit cups radially disposed about said turret, a second turret, fruit holding means mounted thereon and adapted to hold severed halves of a whole fruit with their cut faces in engaging, confronting relation and with the stem axis of the fruit halves disposed downwardly inclined at an angle substantially thirty degrees with respect to a horizontal plane, guide means disposed parallel to a line intersecting the axes of said turrets, transfer means movable along said guide means, spreader plates disposed adjacent the path of movement of the fruit cups, means for shifting the spreader plates from vertical juxtaposed position to horizontal position overlying a pair of adjacent fruit cups, said transfer means including mechanism for abducting the fruit halves from the holding means and moving them onto the vertical spreader plates, said spreader plates pivotally shifting about a horizontal axis substantially parallel to the track means, whereby each of said fruit halves is deposited in one of the radially disposed fruit cups.

33. In a device of the class described, in combination with a stationary support, an upright thereon, a shaft within said upright, a plurality of cams mounted upon said upright, a turret surrounding said upright and intermittently rotatable thereabout, a pair of spreader plates associated with said upright, means actuated by one of said cams on said upright for shifting said spreader plates from vertical to horizontal position, fruit holding means adapted to be intermittently associated with each spreader plate to position a half fruit thereon, each of said spreader plates having actuatable clamping means on its outer face adapted to engage the outer surface of the half fruit to hold the same on the spreader plate, a second turret having fruit holding means thereon comprising actuatable jaws adapted to engage the severed halves of a whole fruit to hold the same with the cut faces in confronting, engaging relation, transfer means disposed axially of said first and second turrets, transfer jaws shiftable along said transfer means for abducting the fruit halves from the fruit holding means of said second turret and for passing the same onto the spreader plates, means operated by one of the cams on the upright for releasing the fruit clamping means on each spreader plate as such spreader plate approaches horizontal position.

34. As an article of manufacture, a peach holder comprising a quarter section of a shell-like element having an elongated centrally disposed lug extending diametrically through the bottom inner wall of the shell, said lug being substantially curvilinear in conformation at its top, and a wall portion of the shell in the plane of projection being cut away to provide a relatively deep notch.

35. In a fruit treating machine, a first fruit conveyor, a second fruit conveyor spaced therefrom, and a transfer mechanism for transferring the fruit from the first to the second conveyor, said transfer mechanism including oppositely shiftable jaw members, means for closing said jaw members to grip the fruit while on the first conveyor, rectilinearly shiftable means for carrying said jaw members to the second conveyor, means for opening said jaw members to release the fruit on the second conveyor, and means for driving said rectilinearly shiftable means, said driving means including a crank, and means connnecting said crank to said rectilinearly shiftable means for increasing the period of slow movement of the shiftable means as it approaches its opposite limits of movement to provide a greater interval for the opening and closing movements of the jaw members.

36. In a fruit treating machine, a first conveyor, a second conveyor, and mechanism for transferring fruit from the first conveyor to the second conveyor, said transfer mechanism including a rectilinearly shiftable support, a pair of oppositely shiftable jaw members carried by said support for movement therewith to grasp a fruit on the first conveyor and release it to the second conveyor, and means for driving the rectilinearly shiftable support and including a rotary member, a member pivoted on said rectilinearly shiftable support and having a lost-motion connection to said rectilinearly shiftable means to permit relative movement between said pivoted member and said shiftable support, a link connecting said pivoted member to said rotary member, and independently adjustable spaced-apart stop members engageable with said pivoted member independently to determine the limits of movement of said rectilinearly shiftable support.

37. In a device of the class described, in combination with a stationary support, a carrier movable thereon in a predetermined plane, relatively shiftable peach holding members shiftably mounted on said carrier and movable toward and from each other in a predetermined plane to hold a whole peach therebetween and to carry the peach so held with the carrier when the latter moves, said holding means having wall portions internally conformed to contact and grip substantially diametrically opposed wall surfaces of the whole peach on opposite sides of the peach suture, means for positioning said carrier at a feeding station and for holding said carrier stationary thereat, means for holding said holding members open while at said station, fruit receiving means operable toward and from said station, and having wall portions internally conformed to the general shape of the curved external surfaces of the whole peach, a part of said internal wall portions being provided with means adapted to enter the stem cavity of the whole peach whereby to position the peach in said receiving means with the stem axis of the peach in predetermined position relative thereto, means for shifting said fruit receiving means from a point remote from said fruit holding means at said station to a point adjacent said open fruit holding means at said station, and whereby to shift the whole peach and with the stem axis of the peach disposed in the plane in which said fruit holding members shift toward and from each other, to a position between said fruit holding members and with the stem axis thereof angularly disposed with respect to the plane of movement of the whole fruit when carried by said fruit holding members during the movement of the carrier, means for thereafter removing said receiving means from the position adjacent said receiving members and for closing said members upon the whole fruit so positioned therebetween, and means for thereafter moving said carrier to move the whole fruit so positioned away from said station by means of said holding member.

38. In a device of the class described, in combination with a support, a turret mounted thereon for movement relative to a whole fruit feed-in station, whole fruit holding means including a pair of jaws reciprocably mounted on said turret and adapted to receive a whole peach therebetween to cause substantially the center of said whole peach to travel in a circular path in a predetermined plane, means for opening and closing said jaws, whole fruit receiving means having fruit holding walls and a positioning member thereon generally shaped to fit the stem cavity of the whole peach and arranged to hold the stem axis of the whole peach substantially at right angles to the plane of movement of the whole peach when carried about by said carrier, means for shiftably mounting said receiving means for shiftably mounting said receiving means on said support whereby to cause the whole peach so positioned thereon, when relatively remote from a pair of jaws, to be positioned at said whole fruit feed-in station and placed precisely between the jaws of said whole fruit holding means when in open position at said feed-in station and with the stem axis of the whole peach disposed at substantially an acute angle to the plane in which the peach is carried by said jaws in said carrier means, means acting in timed relation with the closing of said jaws for shifting said receiving means away from said jaws and for moving said turret away from its former position while so carrying the whole peach therebetween.

39. In a device of the class described, in combination with a stationary support, an intermittently movable carrier shiftable on said support to a whole fruit feeding station, relatively shiftable whole peach holding members mounted on and movable with said carrier, said members having shiftable fruit holding portions adapted to receive and hold a whole fruit therebetween and on movement of the carrier to shift the whole fruit held therebetween in a predetermined plane, a whole fruit receiving means mounted on said support adjacent said carrier and having concaved fruit supporting inner walls and positioning means on its inner walls configured generally to correspond with the stem cavity of a whole fruit whereby, when the stem cavity of the whole fruit is positioned thereon the rounded walls of the whole peach will rest on said concaved walls of the receiving means, means for shifting said concaved receiving means from a position removed from said holding means when at said whole fruit feeding station, to a position in which the whole peach is placed between the relatively shiftable holding members with the stem axis of the peach downwardly inclined with respect to the aforesaid predetermined plane of movement of the jaws at an angle substantially thirty degrees relatively thereto, and means for shifting said holding means to grasp the whole peach and to hold the same with the stem axis thereof in such predetermined position and for removing the concaved receiving means from said holding means and for thereafter shifting the carrier.

40. In a fruit treating machine, fruit holding means comprising opposed fruit receiving jaws spaced apart and movable to and from each other in a predetermined plane to receive and close upon and hold a whole peach therebetween, means for moving said jaws to a feed-in station whereby said jaws at said station operate in a predetermined plane, and a device shiftable substantially in said plane of and toward and from said jaw members for feeding the whole peach into position between said jaw members, said device comprising whole peach holding means shiftable substantially in said plane of movement of said jaw members and having internal concave bottom and side wall surfaces and open at the top, said surfaces at least partially encompassing a portion of the bottom and side walls of a whole peach placed therebetween, said holder having an elongated bottom wall portion projecting inwardly beyond said internal concave surfaces and positioned substantially to conform to and project into the stem cavity of the whole peach when the latter is placed on said holder and to assist in positioning the whole peach with its stem axis in a predetermined direction substantially parallel to and in the said plane of movement of said jaw members when moving toward each other to grip and hold the peach therebetween.

41. In a device of the class described, in combination with means for holding two severed halves of a whole fruit with their cut faces in confronting, engaging relation, means having opposite flat faces adapted to receive fruit halves thereon, fruit transfer means shiftable in a straight line between the fruit holding means and the fruit receiving means, and means adapted to separate the fruit halves during their transfer from the fruit holding means to the flat faces of the second named means.

42. In a device of the class described, in combination with a fruit holding means adapted to hold peach halves with their cut faces in engaging, confronting relation, a pair of spreader plates disposed in spaced relation therefrom, said plates being shiftable from a vertical position wherein their rear faces are in juxtaposed position to a position wherein outer faces of the spreader plates are in substantially horizontal position, fruit transfer means for abducting the fruit halves from the holding means for carrying them onto the outer faces of the vertical spreader plates, each of the plates having clamping means thereon, and means for positively shifting the clamping means to open position to permit the placing of each half fruit on said plate, and spring means operatively associated with said fruit retaining means to close said means on said fruit to hold the half fruit on the spreader plate during the movement of the spreader plate substantially to horizontal position, each of said clamping means having a beveled inner wall portion for wedgingly engaging the upper, outer surface of said peach halves for pressing the same inwardly and downwardly with respect to the outer face of the spreader plate.

43. In a device of the class described, in combination with a turret movable about a central axis, spaced pairs of spaced, radially disposed cups thereon, a pair of spreader plates disposed remote from said cups and pivotally movable about spaced, parallel axes to shift from fruit receiving position wherein the plates are juxtaposed back to back in parallelism and with their planes parallel to and substantially lying in the plane of the central axis of said turret and in which position said plates are adapted to receive a half fruit on the outer face of each plate, said plates shifting to a fruit discharging position wherein the plates are shifted substantially ninety degrees and lie spaced apart in substantially a common plane, means for placing a half fruit on the outer face of each plate when said plates are in receiving position, said half fruits being placed thereon with their stem axes lying in parallel planes and with the stem axes inclined with respect to the parallel axes about which said spaced plates are shifted, whereby when said plates carrying said half fruits so positioned thereon, shift to lie in a common plane, the projections of the stem axes will lie radially of the central axis of the turret and will intersect substantially at said stem axes.

44. In an apparatus of the character described, the combination of a pair of plates mounted to shift about spaced parallel axes from a vertical position with the backs of the plates substantially touching and the plates lying parallel, to a position substantially ninety degrees removed therefrom wherein the plates lie in a common plane with their spaced edges parallel, a turret disposed adjacent said plates and having a plurality of spaced apart, radially disposed cups positioned so that a radially disposed cup underlies each plate when in horizontal position, and means for placing a half peach on the outside face of each plate when the plates are in vertical position, the half peaches being placed thereon so that the stem axes lie at an inclination to the spaced parallel axes about which said plates shift, whereby when said half peaches are deposited in the cups said stem axes will lie in the cups with the stem axes lying in the radii of the turret which carries the cups.

45. In combination with a carrier having a pair of fruit holding jaws adapted to receive and hold a whole peach therebetween on opposite sides of the suture plane of the whole peach, a cradle mounted to shift with respect to said jaws, from a position remote thereto to a position adjacent the opening between said jaws when said jaws are open, said cradle having concave sides and open at the top, the bottom of the cradle being provided with upstanding projections fitting the stem cavity of the whole peach, and means for shifting the cradle with the whole peach so positioned therein into position adjacent the open jaws of the fruit holder, and means for shifting the open jaws to closed position to grasp the whole peach, said cradle shifting means thereafter causing the cradle to shift away from said closed jaw.

46. In a device of the character described, the combination of means for transporting a half peach along a predetermined path and with the cut face of the half peach maintained in a predetermined plane intersecting said path and with the stem axis of the half peach inclined to the path of movement of said peach in said predetermined plane, a rotatable turret having a radially disposed peach receiving cup having an open mouth, the plane of which is disposed transversely to said predetermined plane and positioned laterally thereof, and means for shifting the half peach about an axis lying parallel to said predetermined plane to deposit said half peach in said peach receiver whereby said stem axis of said peach, when deposited in said cup, will coincide with the axis of said turret.

RAYMOND L. EWALD.
HENRY A. SKOG.